United States Patent [19]

Nakanishi et al.

[11] Patent Number: 5,726,000
[45] Date of Patent: Mar. 10, 1998

[54] DISPERSION OF FINE SOLID PARTICLES AND METHOD FOR PRODUCING THE SAME

[75] Inventors: Masatoshi Nakanishi; Yukoh Saitoh; Masahiro Fukuoka, all of Kanagawa, Japan

[73] Assignee: Fuji Photo Film Co., Ltd., Kanagawa, Japan

[21] Appl. No.: 854,054

[22] Filed: May 8, 1997

Related U.S. Application Data

[63] Continuation of Ser. No. 507,841, Jul. 27, 1995, abandoned.

[30] Foreign Application Priority Data

Jul. 27, 1994 [JP] Japan ................................ 6-193815

[51] Int. Cl.$^6$ ................................ G03C 1/815; G03C 1/825
[52] U.S. Cl. ................................ 430/510; 430/517; 430/522; 430/631; 430/635; 430/637
[58] Field of Search ................................ 430/510, 517, 430/522, 631, 637, 635

[56] References Cited

U.S. PATENT DOCUMENTS

| | | | |
|---|---|---|---|
| 5,232,825 | 8/1993 | Hattori et al. | 430/523 |
| 5,252,453 | 10/1993 | Tsaur et al. | 430/637 |

FOREIGN PATENT DOCUMENTS

| | | |
|---|---|---|
| 0015601 | 9/1980 | European Pat. Off. |
| 0019298 | 11/1980 | European Pat. Off. |
| 0037798 | 10/1981 | European Pat. Off. |
| 02225287 | 6/1987 | European Pat. Off. |
| 0528435 | 2/1993 | European Pat. Off. |
| 0549486 | 6/1993 | European Pat. Off. |
| 0589458 | 3/1994 | European Pat. Off. |
| 2757330 | 6/1978 | Germany. |
| WO-A 88 04794 | 6/1988 | WIPO. |

OTHER PUBLICATIONS

Derwent Abstract of JP-A-02 282 244.

*Primary Examiner*—Geraldine Letscher
*Attorney, Agent, or Firm*—Sughrue, Mion, Zinn, Macpeak & Seas, PLLC

[57] ABSTRACT

A dispersion of fine solid particles having good production suitability, good dispersion stability and high spectral absorption, which is obtained by pulverizing an aqueous slurry of a dye represented by general formula (II) in the presence of a polyalkylene oxide represented by general formula (I-a) or (I-b):

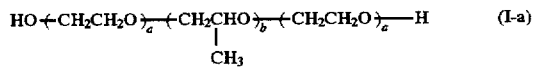

(I-a)

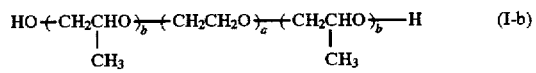

(I-b)

wherein a and b each represents a value of 5 to 500.

$$D-(X)_y \qquad (II)$$

wherein D represents a compound residue having a chromophore, X represents dissociative hydrogen or a group having dissociative hydrogen, and y is an integer of 1 to 7. An embodiment that a compound represented by general formula (I) is present together with the polyalkylene oxide of general formula (I-a) or (I-b) is also disclosed.

6 Claims, No Drawings

DISPERSION OF FINE SOLID PARTICLES AND METHOD FOR PRODUCING THE SAME

This a Continuation of application Ser. No. 08/507,841 filed Jul. 27, 1995 (abandoned).

FIELD OF THE INVENTION

The present invention relates to a dispersion of fine solid dye particles having preferable production suitability, for example, low in viscosity, having no non-Newtonian property and reduced in bubble entrainment, and having good dispersion stability, when the dispersion is produced by pulverization, and a method for producing the same. In particular, the present invention relates to a dispersion of fine solid dye particles which does not migrate between hydrophilic colloidal layers of a silver halide photographic material during storage, is photochemically inactive, has excellent light absorption characteristics, and is decolored and/or eluted so as not to generate residual color staining at the time of development, when the dispersion is added to the colloidal layers, and a method for producing the same.

BACKGROUND OF THE INVENTION

For the purpose of absorbing light of a specified wavelength range, photographic emulsion layers or other layers are often colored in silver halide photographic materials. Such colored layers are called filter layers, antihalation layers, crossover cut filters, etc. corresponding to their purpose. Further, in order to prevent irradiation, photographic emulsion layers are also colored.

These layers to be colored are composed of hydrophilic colloids in may cases. For their coloration, therefore, dyes are usually added to the hydrophilic colloids. It is necessary for the dyes to satisfy the following requirements:

(1) They have proper spectral absorption according to their purpose of use;

(2) They are photochemically inactive. That is, they do not exert adverse effects such as deterioration of sensitivity, regression of latent images and fogging on the performance of the silver halide photographic emulsion layers;

(3) They are decolored or removed by dissolution in the course of photographic processing to leave no harmful coloration in photographic materials after processing;

(4) They do not diffuse from colored layers to other layers; and (5) They are excellent in aging stability in solutions or photographic materials, and not discolored.

In terms of satisfying such requirements, methods are excellent in which water-insoluble solid dyes are used to dye specified layers. Such methods are disclosed in JP-A-55-120030 (the term "JP-A" as used herein means an "unexamined published Japanese patent application"), JP-A-56-12639, JP-A-55-155350, JP-A-55-155351, JP-A-63-27838, JP-A-63-197943, JP-A-52-92716, JP-A-64-40827, JP-A-2-282244, European Patent Publication Nos. 15601, 323729, 274723, 276566 and 299435, and PCT International Publication No. 88/04794.

For these dye dispersions, aqueous slurries are prepared from powdered dyes or dyes in the state wetted with water or organic solvents, which are called "wet cakes", in the presence of dispersing aids, and pulverized by collisions with dispersion media (balls or beads) or equipment, collisions of particles with one another or mechanical force due to shear fields, resulting in dispersions of fine solid particles. The dispersing aids which have been disclosed include alkylphenoxyethoxysulfonates, alkylnapnthalenesulfonates, polyvinylalcohol, polyvinylpyrrolidone and sodium oleylmethyltauride.

Recently, the necessity to obtain higher covering power has been increased. It is therefore desired to obtain a dispersion of fine particles having high spectral absorption.

In particular, such a dispersion is frequently produced by passing a dispersion solution in a dispersing apparatus. At this time, an increase in viscosity or significant non-Newtonian viscous behavior such as thixotropy during dispersion causes the problems that a passage is clogged and that homogeneous stirring is impossible, resulting in the difficulty of dispersion. Further, bubble entrainment at the time of slurry preparation or during dispersion produces spaces or voids in the passage or increases the apparent volume of the dispersion solution, resulting in a reduction in dispersion efficiency.

Finished dispersions are often stored without addition of protective colloids. It is therefore necessary that aggregation or irreversible precipitation does not occur at elevated temperatures or by the elapse of time during storage.

However, when the dispersing aids which have been disclosed are used, it is difficult to satisfy all of these requirements.

SUMMARY OF THE INVENTION

An object of the present invention is to provide a method for producing a dispersion of fine solid dye particles high in spectral absorption, having preferable production suitability, for example, low in viscosity, having no non-Newtonian property, reduced in bubble entrainment and finely pulverizable for a short period of time, and having good dispersion stability, when the dispersion is produced by pulverization.

Further, another object of the present invention is to provide a dispersion of fine solid dye particles which does not migrate between hydrophobic colloidal layers of a silver halide photographic material during storage, is photochemically inactive, has excellent light absorption characteristics, and is decolored and/or eluted so as not to generate residual color staining at the time of development, when the dispersion is added to the colloidal layers.

The objects of the present invention are attained by a dispersion of fine solid particles obtained by pulverizing an aqueous slurry of a dye represented by the following general formula (II) in the presence of a polyalkylene oxide represented by the following general formula (I-a) or (I-b), and a method for producing the same.

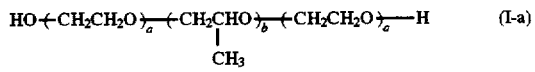

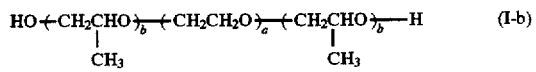

wherein a and b each represents a value of 5 to 500.

wherein D represents a residue of compound having a chromophore, X represents dissociative hydrogen or a group having dissociative hydrogen, and y is an integer of 1 to 7.

The dispersing aids represented by general formula (I-a) or (I-b) have no electric charge, so that no electrostatic repulsion is considered to take place among dispersed particles. It is an entirely unexpected effect that the dispersions sufficient in dispersibility, low in viscosity, namely weak in interaction among particles, and stable to heat or the elapse of time are obtained using such compounds.

DETAILED DESCRIPTION OF THE INVENTION

The present invention will be illustrated in detail below.

First, the dispersing aids represented by the following general formula (I-a) or (I-b) are described.

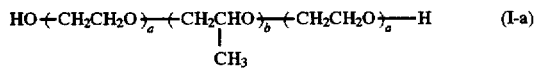
(I-a)

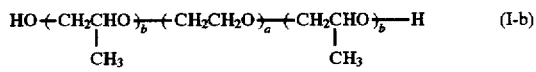
(I-b)

wherein a and b each represents a value of 5 to 500.

In the above-described dispersing aids, the weight ratio of polyethylene oxide moieties is preferably 0.3 to 0.9, more preferably 0.7 to 0.9, and further more preferably 0.8 to 0.9. The average molecular weight thereof is preferably 1,000 to 40,000, more preferably 5,000 to 40,000, and further more preferably 10,000 to 20,000. Further, the HLB (Hydrophile Lipophile Balance) of the above-described dispersing aids is preferably 7 to 30, more preferably 12 to 30, and further more preferably 18 to 30.

These compounds are commercially available, for example, from BASF.

Examples of the compounds represented by general formula (I-a) or (I-b) used in the present invention are described below.

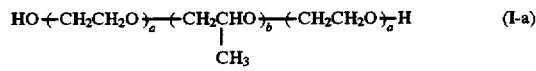
(I-a)

| No. | Weight Ratio of Polyethylene Oxide | Average Molecular Weight | HLB |
|---|---|---|---|
| I-1 | 0.5 | 1900 | ≧18 |
| I-2 | 0.8 | 4700 | ≧20 |
| I-3 | 0.3 | 1850 | 7–12 |
| I-4 | 0.4 | 2200 | 12–18 |
| I-5 | 0.4 | 2900 | 12–18 |
| I-6 | 0.5 | 3400 | 12–18 |
| I-7 | 0.8 | 8400 | ≧20 |
| I-8 | 0.7 | 6600 | ≧20 |
| I-9 | 0.4 | 4200 | 12–18 |
| I-10 | 0.5 | 4600 | 12–18 |
| I-11 | 0.7 | 7700 | ≧20 |
| I-12 | 0.8 | 11400 | ≧20 |
| I-13 | 0.8 | 13000 | ≧20 |
| I-14 | 0.3 | 4950 | 7–12 |
| I-15 | 0.4 | 5900 | 12–18 |
| I-16 | 0.5 | 6500 | 12–18 |
| I-17 | 0.8 | 14600 | ≧20 |
| I-18 | 0.3 | 5750 | 7–12 |
| I-19 | 0.7 | 12600 | ≧18 |

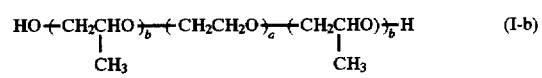
(I-b)

| No. | Weight Ratio of Polyethylene Oxide | Average Molecular Weight | HLB |
|---|---|---|---|
| I-20 | 0.5 | 1950 | 12–18 |
| I-21 | 0.4 | 2650 | 7–12 |
| I-22 | 0.4 | 3600 | 7–12 |
| I-23 | 0.8 | 8600 | 12–18 |

In the present invention, the weight ratio of the above-described dispersing aids used in the present invention to the dyes is preferably 0.05 to 0.5, and more preferably 0.1 to 0.2.

Then, the dyes represented by the following general formula (II) are described below.

(II)

wherein D represents a residue of compound having a chromophore, X represents dissociative hydrogen or a group having dissociative hydrogen, and y is an integer of 1 to 7.

The dyes represented by general formula (II) in the present invention are characterized by that dissociative hydrogen is contained in molecular structure.

The compounds having chromophores in D can be selected from many known dyes. Such compounds include oxonol dyes, merocyanine dyes, cyanine dyes, arylidene dyes, azomethine dyes, triphenylmethane dyes, azo dyes, anthraquinone dyes and indoaniline dyes.

Dissociative hydrogen or the group having dissociative hydrogen represented by X has the characteristics that it is undissociated to make the dye represented by formula (II) substantially water-insoluble in a state in which the dye represented by formula (II) is added to a silver halide photographic material, and has the characteristics that it is dissociated to make the dye represented by formula (II) substantially water-soluble in a step in which the photographic material is developed. Examples of the groups having dissociative hydrogen represented by X include groups having carboxylic acid groups, sulfonamido groups, sulfamoyl groups, sulfonylcarbamoyl groups, acylsulfamoyl groups or phenolic hydroxyl groups. The dissociative hydrogen represented by X includes hydrogen of enol groups of the oxonol dyes.

Of the compounds represented by formula (II), compounds are preferred in which the groups having dissociative hydrogen in X are the groups having the carboxylic acid groups, and compounds are particularly preferred in which the groups are aryl groups substituted by carboxyl groups.

Further, of the compounds represented by formula (II), a compound represented by the following general formula (III) or (IV) is preferred.

(III)

wherein $A^1$ represents an acidic nucleus, Q represents an aryl group or a heterocyclic group, $L^1$, $L^2$ and $L^3$ each represents a methine group which may be substituted, and m is 0, 1 or 2, with the proviso that the compound represented by formula (III) has 1 to 7 groups selected from the group consisting of carboxylic acid groups, sulfonamido groups, sulfamoyl groups, sulfonylcarbamoyl groups, acylsulfamoyl groups, phenolic hydroxyl groups and enol groups of oxonol dyes in the molecule as water-soluble groups, which group corresponds to "X" in formula (II);

$$A^1=L^1+L^2=L^3\underset{n}{)}A^2 \qquad (IV)$$

wherein $A^1$ and $A^2$ each represents an acidic nucleus, $L^1$, $L^2$ and $L^3$ each represents a methine group which may be substituted, and n is 0, 1, 2 or 3, with the proviso that the compound represented by formula (IV) has 1 to 7 groups selected from the group consisting of carboxylic acid groups, sulfonamido groups, sulfamoyl groups, sulfonylcarbamoyl groups, acylsulfamoyl groups, phenolic hydroxyl groups and enol groups of oxonol dyes in the molecule as water-soluble groups, which group corresponds to "X" in formula (II).

General formulas (III) and (IV) are described in detail below.

Preferred examples of the acidic nuclei represented by $A^1$ and $A^2$ include cyclic ketomethylene compounds and compounds having methylene groups interposed between electron attractive groups.

Examples of the cyclic ketomethylene compounds include 2-pyrazoline-5-one, rhodanine, hydantoin, thiohydantoin, 2,4-oxazolidinedione, isooxazolone, barbituric acid, thio-barbituric acid, indandione, dioxopyrazolopyridine, hydroxy-pyridone, pyrazolidinedione and 2,5-dihydrofuran. They may have substituent groups.

The compounds having methylene groups interposed between electron attractive groups can be represented by $Z^1CH_2Z^2$, wherein $Z^1$ and $Z^2$ each represents —CN, —$SO_2R^{11}$, —$COR^{11}$, —$COOR^{12}$, —$CONHR^{12}$, —$SO_2NHR^{12}$ or —$Cl=C(CN)_2]R^{11}$, wherein $R^{11}$ represents an alkyl group, an aryl group or a heterocyclic group, and $R^{12}$ represents a hydrogen atom or a group represented by $R^{11}$, each of which may have a substituent group.

Examples of the aryl groups represented by Q include phenyl and naphthyl. They may each have a substituent group. Examples of the heterocyclic groups represented by Q include pyrrole, indole, furan, thiophene, imidazole, pyrazole, indolizine, quinoline, carbazole, phenothiazine, phenoxazine, indoline, thiazole, pyridine, pyridazine, thiadiazine, pyran, thiopyran, oxodiazole, benzoquinoline, thiadiazole, pyrrolothiazole, pyrrolopyridazine, tetrazole, oxazole, coumarin and coumarone. They may have substituent groups.

The methine groups represented by $L^1$, $L^2$ and $L^3$ may have substituent groups, which may combine together to form a 5- or 6-membered ring (for example, cyclopentene or cyclohexene).

There is no particular limitation on the substituent groups which the respective groups described above may have, as long as they do not substantially solubilize the compounds of general formulas (II) to (V) in water of pH 5 to 7. Examples of such substituent groups include carboxylic acid groups, sulfonamido groups having 1 to 10 carbon atoms (for example, methanesulfonamido, benzenesulfonamido, butanesulfonamido and n-octanesulfonamido), unsubstituted or alkyl- or aryl-substituted sulfamoyl groups having 0 to 10 carbon atoms (for example, unsubstituted sulfamoyl, methylsulfamoyl, phenylsulfamoyl, naphthylsulfamoyl and butylsulfamoyl), sulfonylcarbamoyl groups having 2 to 10 carbon atoms (for example, methanesulfonylcarbamoyl, propanesulfonylcarbamoyl and benzenesulfonylcarbamoyl), acylsulfamoyl groups having 1 to 10 carbon atoms (for example, acetylsulfamoyl, propionylsulfamoyl, pivaloylsulfamoyl and benzoylsulfamoyl), chain or cyclic alkyl groups having 1 to 8 carbon atoms (for example, methyl, ethyl, isopropyl, butyl, hexyl, cyclopropyl, cyclopentyl, cyclohexyl, 2-hydroxyethyl, 4-carboxybutyl, 2-methoxyethyl, benzyl, phenethyl, 4-carboxybenzyl and 2-diethylaminoethyl), alkenyl groups having 2 to 8 carbon atoms (for example, vinyl and allyl), alkoxy groups having 1 to 8 carbon atoms (for example, methoxy, ethoxy and butoxy), halogen atoms (for example, F, Cl and Br), amino groups having 0 to 10 carbon atoms (for example, unsubstituted amino, dimethylamino, diethylamino and carboxyethylamino), ester groups having 2 to 10 carbon atoms (for example, methoxycarbonyl), amido groups having 1 to 10 carbon atoms (for example, acetylamino and benzamido), carbamoyl groups having 1 to 10 carbon atoms (for example, unsubstituted carbamoyl, methylcarbamoyl and ethylcarbamoyl), aryl groups having 6 to 10 carbon atoms (for example, phenyl, naphthyl, hydroxyphenyl, 4-carboxyphenyl, 3-carboxyphenyl, 3,5-dicarboxyphenyl, 4-methanesulfonamidophenyl and 4-butanesulfonamidophenyl), aryloxy groups having 6 to 10 carbon atoms (for example, phenoxy, 4-carboxyphenoxy, 3-methylphenoxy and naphthoxy), alkylthio groups having 1 to 8 carbon atoms (for example, methylthio, ethylthio and octylthio), arylthio groups having 6 to 10 carbon atoms, for example, phenylthio and naphthylthio), acyl groups having 1 to 10 carbon atoms, for example, acetyl, benzoyl and propanoyl), sulfonyl groups having 1 to 10 carbon atoms (for example, methanesulfonyl and benzenesulfonyl), ureido groups having 1 to 10 carbon atoms (for example, ureido and methylureido), urethane groups having 2 to 10 carbon atoms (for example, methoxycarbonylamino and ethoxycarbonylamino), cyano, hydroxyl, nitro and heterocyclic groups (for example, a 5-carboxybenzoxazole ring), a pyridine ring, a sulfolane ring, a pyrrole ring, a pyrrolidine ring, a morpholine ring, a piperazine ring, a pyrimidine ring and a furan ring).

Of the compounds represented by general formula (IV), compounds represented by general formula (V) are more preferred. The compounds represented by general formula (V) have enolic hydrogen as dissociative hydrogen.

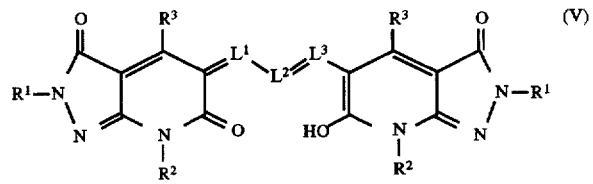

wherein $R^1$ represents a hydrogen atom, an alkyl group, an aryl group or a heterocyclic group, $R^2$ represents a hydrogen atom, an alkyl group, an aryl group, a heterocyclic group, —$COR^4$ or —$SO_2R^4$, $R^3$ represents a hydrogen atom, a cyano group, a hydroxyl group, a carboxyl group, an alkyl group, an aryl group, —$CO_2R^4$, —$OR^4$, —$NR^5R^6$, —$CONR^5R^6$, —$NR^5COR^4$, —$NR^5SO_2R^4$ or —$NR^5CONR^5R^6$ (wherein $R^4$ represents an alkyl group or an aryl group, and $R^5$ and $R^6$ each represents an hydrogen atom, an alkyl group or an aryl group), and $L^1$, $L^2$ and $L^3$ each represents a methine group.

The alkyl groups of $R^1$ include alkyl groups having 1 to 4 carbon atoms, 2-cyanoethyl, 2-hydroxyethyl and carboxybenzyl, and the aryl groups include phenyl, 2-methylphenyl, 2-carboxyphenyl, 3-carboxyphenyl, 4-carboxyphenyl, dicarboxyphenyl, 2-hydroxyphenyl, 3-hydroxyphenyl, 4-hydroxyphenyl, 2-chloro-4-carboxyphenyl and 4-methylsulfamoylphenyl. The heterocyclic groups include the following group:

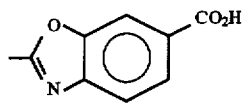

The alkyl groups of $R^2$ include alkyl groups having 1 to 4 carbon atoms, carboxymethyl, 2-hydroxyethyl and 2-methoxyethyl, and the aryl groups include 2-carboxyphenyl, 3-carboxyphenyl, 4-carboxyphenyl and 3,6-dicarboxyphenyl. The heterocyclic groups include the following group:

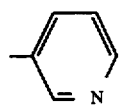

The group of —$COR^4$ includes acetyl, and —$SO_2R^4$ includes methanesulfonyl.

The alkyl groups of $R^3$, $R^4$, $R^5$ and $R^6$ include alkyl groups having 1 to 4 carbon atoms. The aryl groups of $R^3$, $R^4$, $R^5$ and $R^6$ include phenyl and methylphenyl.

In the present invention, it is preferred that $R^1$ is a carboxyl group-substituted phenyl group (for example, 2-carboxyphenyl, 3-carboxyphenyl, 4-carboxyphenyl or 3,6-dicarboxyphenyl).

Examples of the compounds represented by general formulas (II) to (V) used in the present invention are enumerated below, but are not limited thereto.

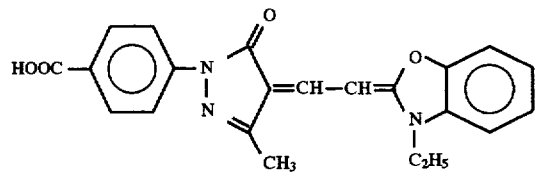
(II-1)

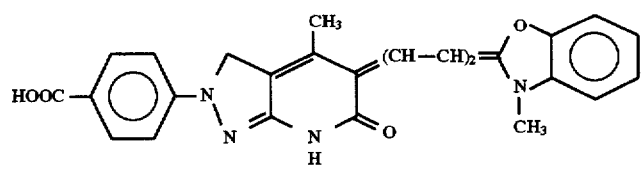
(II-2)

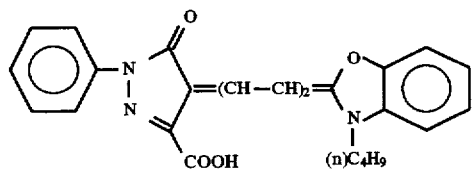

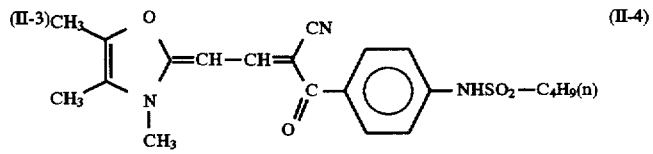
(II-3) (II-4)

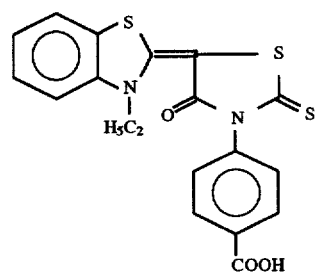
(II-5)

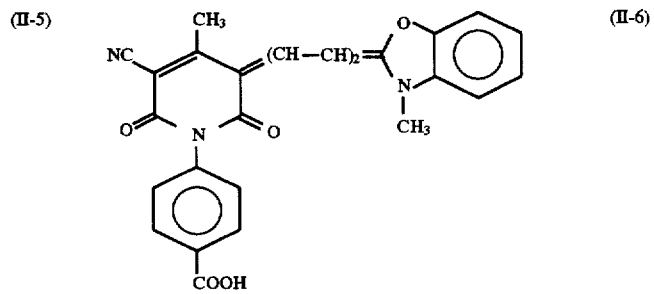
(II-6)

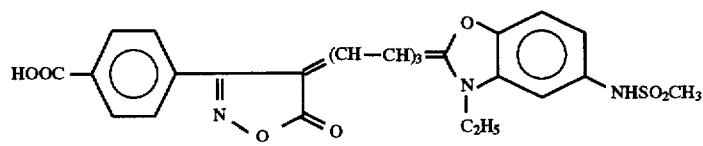
(II-7)

-continued
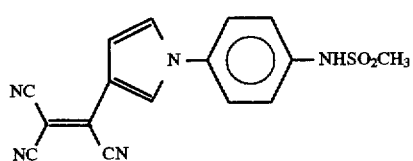 (II-8)
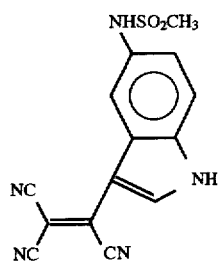 (II-9)
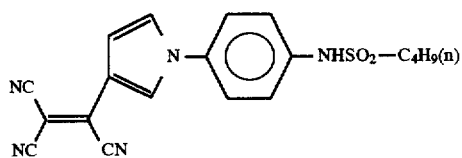 (II-10)
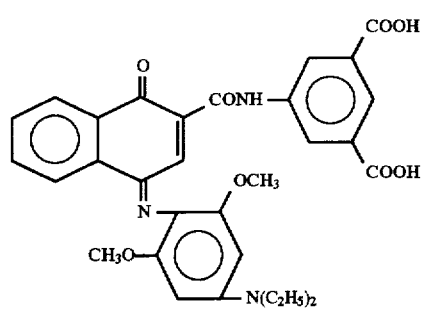 (II-11)
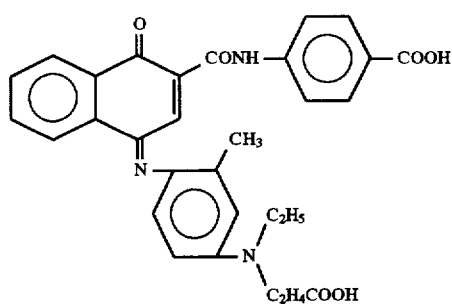 (II-12)
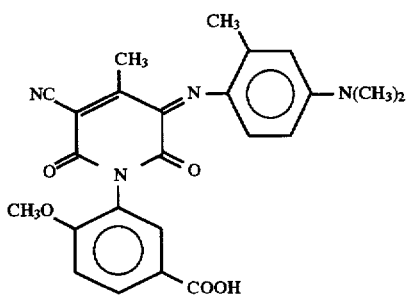 (II-13)
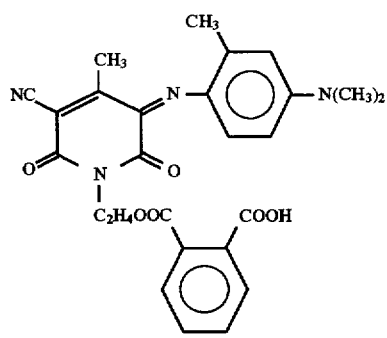 (II-14)
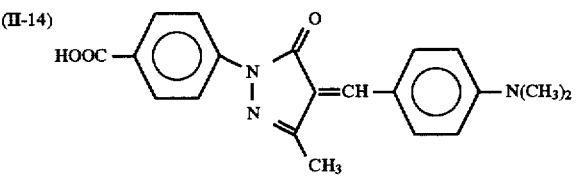 (III-1)
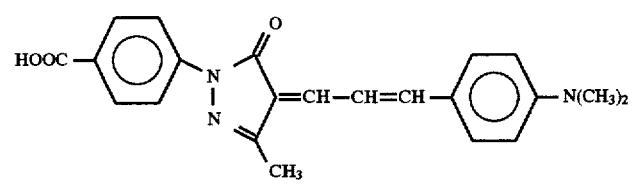 (III-2)
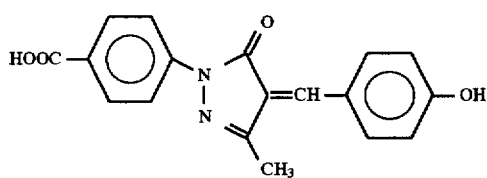 (III-3)
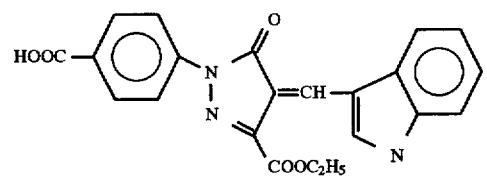 (III-4)

-continued
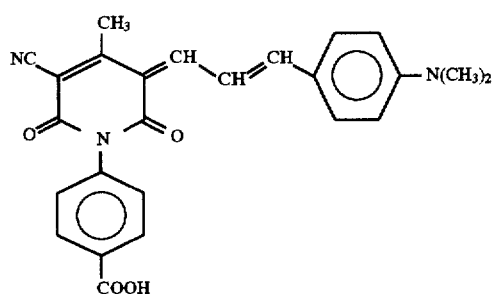 (III-5)
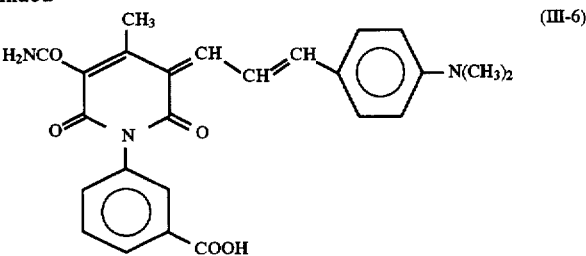 (III-6)
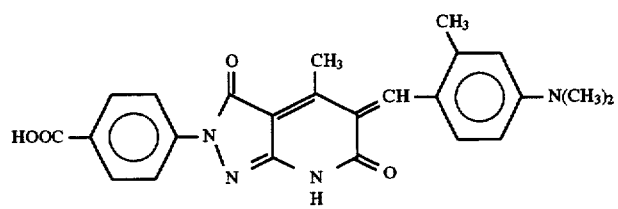 (III-7)
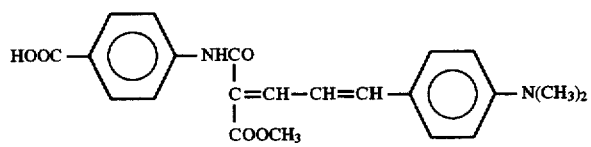 (III-8)
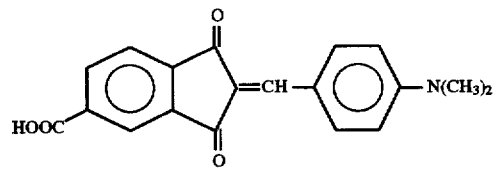 (III-9)
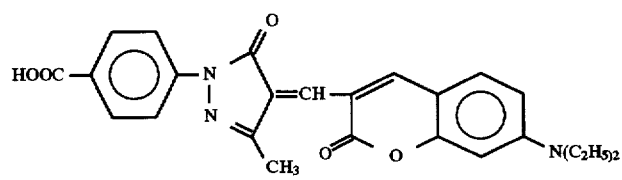 (III-10)
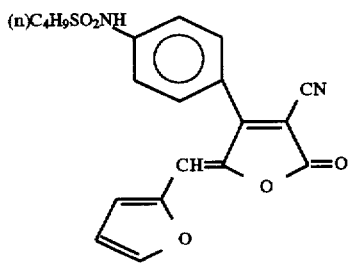 (III-11)
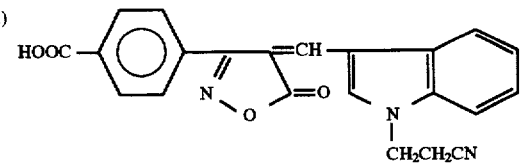 (III-12)
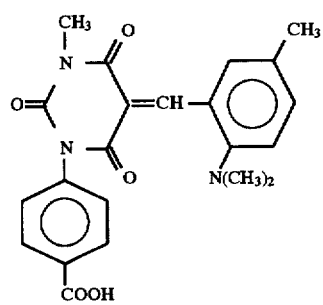 (III-13)
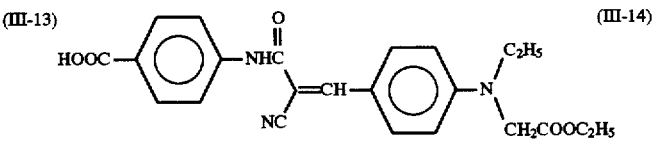 (III-14)

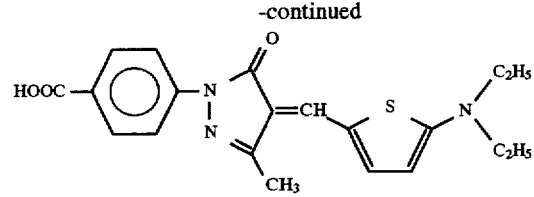
(III-15)
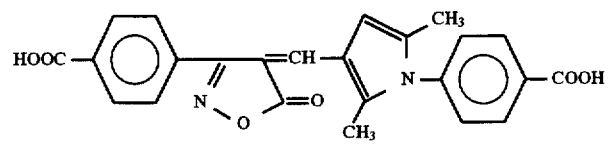
(III-16)
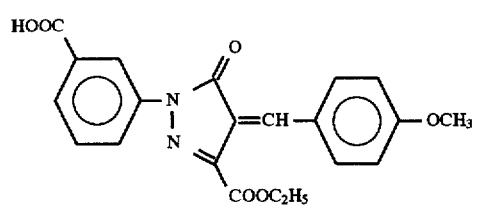
(III-17)
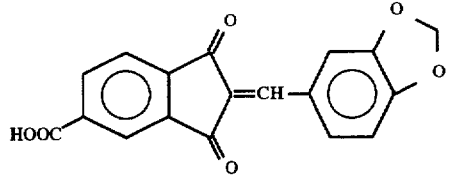
(III-18)
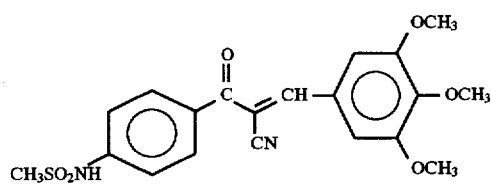
(III-19)
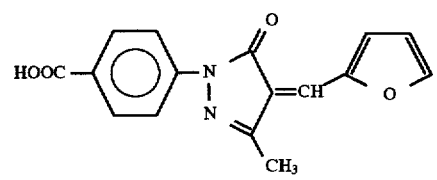
(III-20)
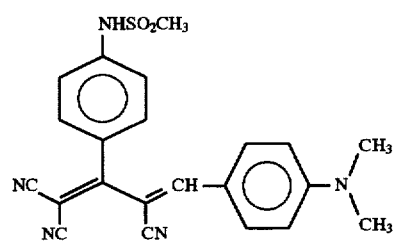
(III-21)
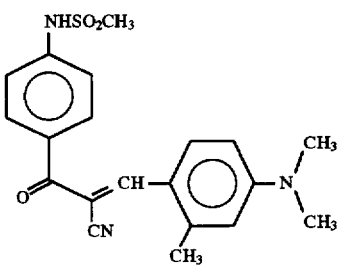
(III-22)
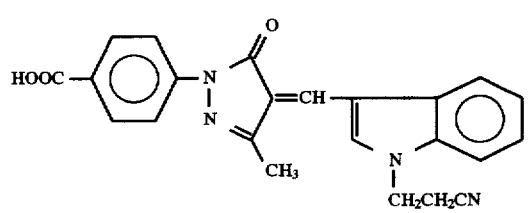
(III-23)
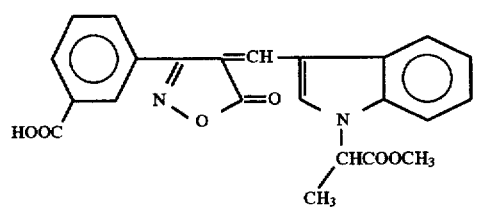
(III-24)
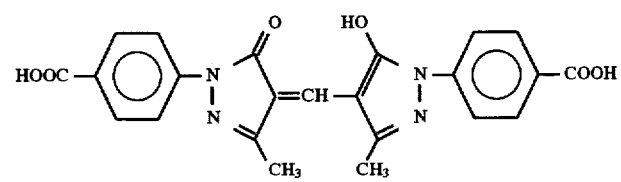
(IV-1)
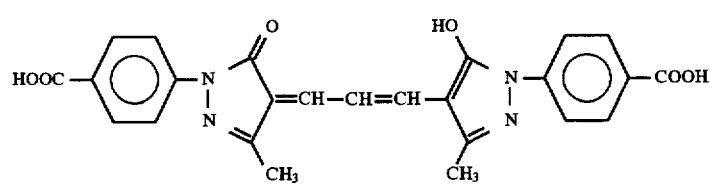
(IV-2)

-continued
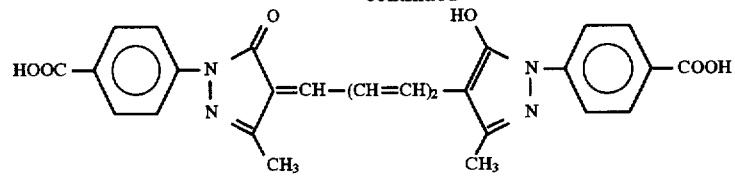
(IV-3)
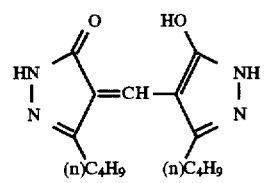
(IV-4)
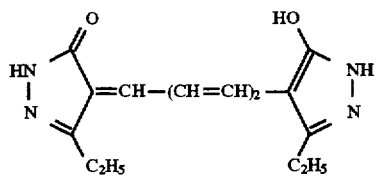
(IV-5)
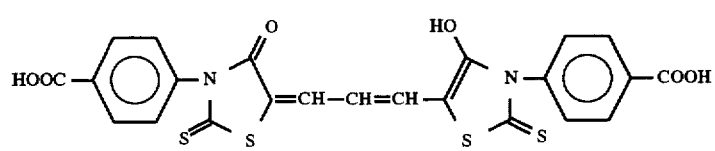
(IV-6)
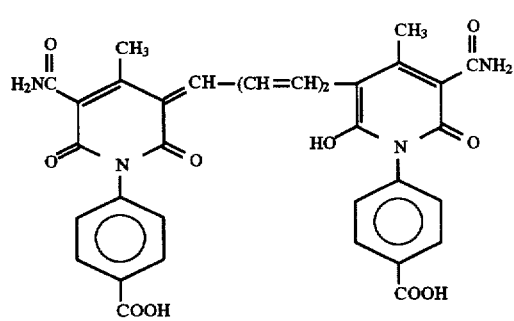
(IV-7)
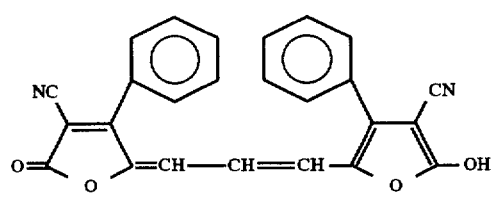
(IV-8)
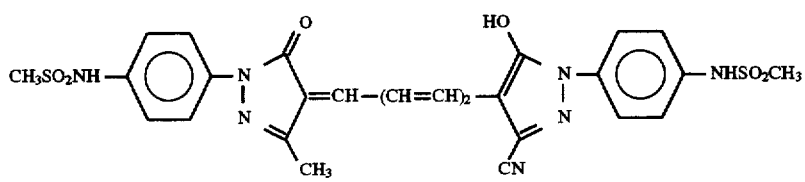
(IV-9)
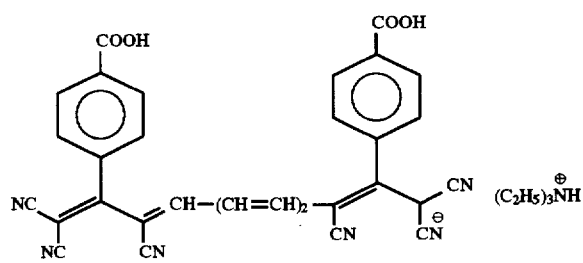
(IV-10)
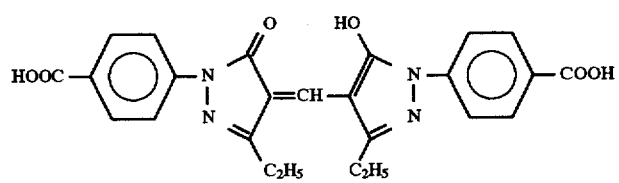
(IV-11)
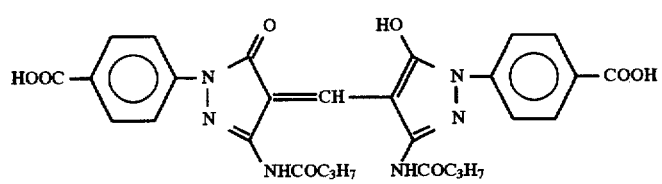
(IV-12)

-continued
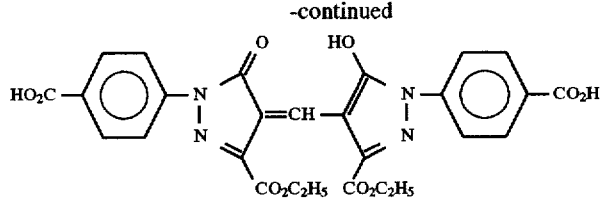 (IV-13)
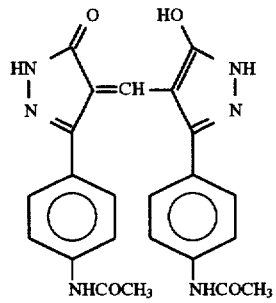 (IV-14)
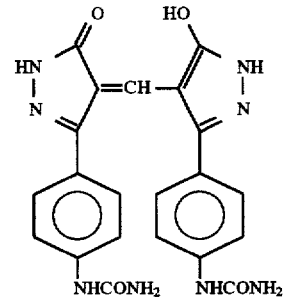 (IV-15)
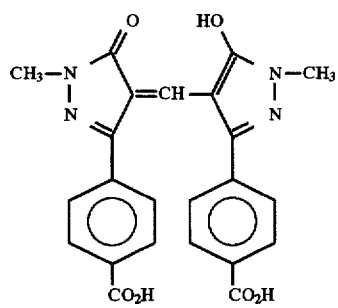 (IV-16)
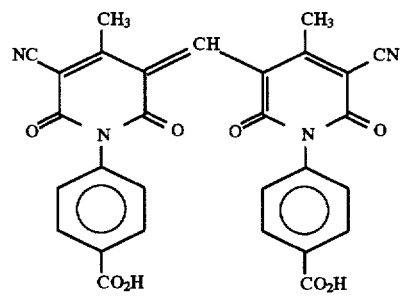 (IV-17)
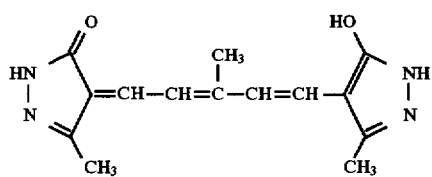 (IV-18)
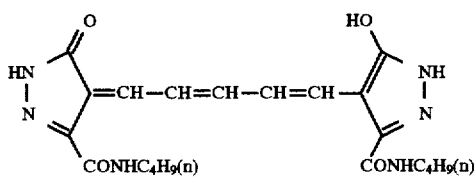 (IV-19)
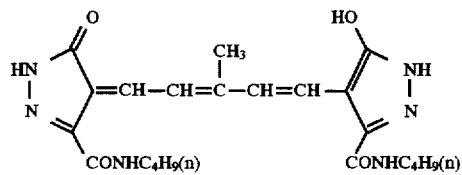 (IV-20)
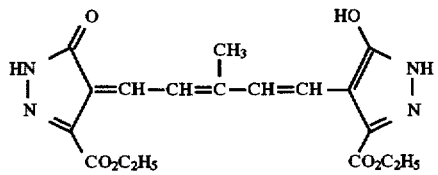 (IV-21)
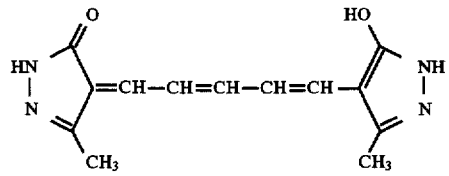 (IV-22)
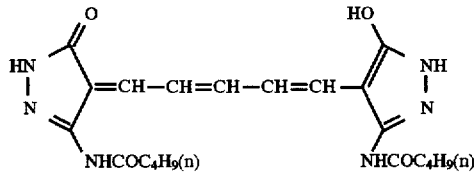 (IV-23)
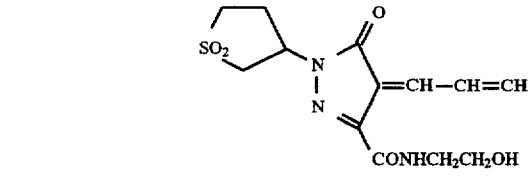 (IV-24)

| | $R^1$ | $R^2$ | $R^3$ | $=L^1-L^2=L^3-$ |
|---|---|---|---|---|
| V-1 | –C₆H₄–CO₂H (para) | H | $CH_3$ | $=CH-CH=CH-$ |
| V-2 | –C₆H₅ | H | $CH_3$ | $=CH-CH=CH-$ |
| V-3 | $CH_3$ | H | $CH_3$ | $=CH-CH=CH-$ |
| V-4 | –C₆H₄–CO₂H (para) | $CH_3$ | $CH_3$ | $=CH-CH=CH-$ |
| V-5 | –C₆H₄–CO₂H (para) | –C₆H₄–CO₂H (para) | $CH_3$ | $=CH-CH=CH-$ |
| V-6 | –C₆H₄–CO₂H (para) | $CH_3$ | $-CO_2C_2H_5$ | $=CH-CH=CH-$ |
| V-7 | –C₆H₄–CO₂H (para) | $CH_3$ | $-CO_2H$ | $=CH-CH=CH-$ |
| V-8 | $CH_3$ | –C₆H₄–CO₂H (para) | $CH_3$ | $=CH-CH=CH-$ |
| V-9 | $CH_3$ | –C₆H₃(CO₂H)₂ (3,5) | $CH_3$ | $=CH-CH=CH-$ |
| V-10 | $CH_3$ | $CH_3$ | $CH_3$ | $=CH-CH=CH-$ |
| V-11 | –C₆H₅ | –C₆H₄–CO₂H (para) | $CH_3$ | $=CH-CH=CH-$ |
| V-12 | –C₆H₅ | –C₆H₃(CO₂H)₂ (3,5) | $CH_3$ | $=CH-CH=CH-$ |

-continued

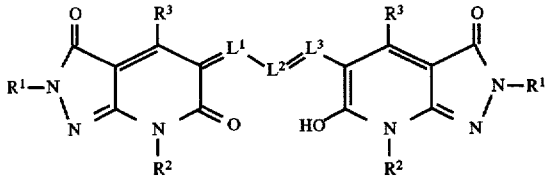

| | $R^1$ | $R^2$ | $R^3$ | $=L^1-L^2=L^3-$ |
|---|---|---|---|---|
| V-13 | 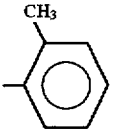 | 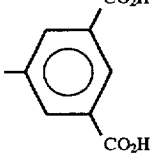 | $CH_3$ | $=CH-CH=CH-$ |
| V-14 | 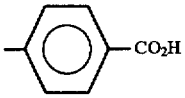 | H | $CH_3$ | $=CH-\underset{\underset{CH_3}{\mid}}{C}=CH-$ |
| V-15 | 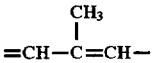 | H | $-CO_2CH_2CH_3$ | $=CH-CH=CH-$ |
| V-16 | 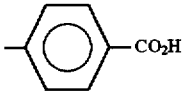 | H | $CO_2$ | $=CH-CH=CH-$ |
| V-17 | 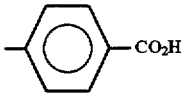 | H | $CH_3$ | $=CH-CH=CH-$ |
| V-18 | 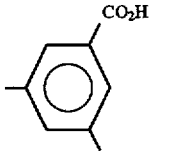 | H | $CH_3$ | $=CH-\underset{\underset{CH_3}{\mid}}{C}=CH-$ |
| V-19 |  | $-CH_2CH_2-OH$ | H | $=CH-CH=CH-$ |
| V-20 | 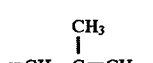 | $-CH_2CO_2H$ | $CH_3$ | $=CH-\underset{\underset{CH_3}{\mid}}{C}=CH-$ |
| V-21 | 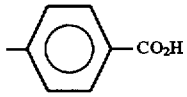 | H | $CH_3$ | $=CH-CH=CH-$ |
| V-22 |  | H | $CH_3$ | $=CH-CH=CH-$ |
| V-23 | $-CH_2CH_2OH$ | H | $CH_3$ | $=CH-CH=CH-$ |
| V-24 | $CH_3$ | $-CH_2CH_2OH$ | $CH_3$ | $=CH-CH=CH-$ |
| V-25 | H | 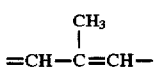 | $CH_3$ | $=CH-CH=CH-$ |

-continued

[Structure: bis-pyrazolopyridone dye with R¹-N substituents on pyrazole nitrogens, R² on pyridone nitrogens, R³ at 4-position, and =L¹-L²=L³- methine chain linker; one side has C=O, other side has C-OH]

| | R¹ | R² | R³ | =L¹−L²=L³− |
|---|---|---|---|---|
| V-26 | H | H | −CO₂H | =CH−CH=CH− |
| V-27 | 2-(benzoxazolyl)-6-CO₂H | H | C₂H₅ | =CH−CH=CH− |
| V-28 | 4-CO₂H-phenyl | −SO₂CH₃ | −CO₂CH₃ | =CH−C(CH₃)=CH− |
| V-29 | 3,5-di(CO₂H)phenyl | −COCH₃ | CH₃ | =CH−CH=CH− |
| V-30 | H | 2-CO₂H-phenyl | CH₃ | =CH−CH=CH− |
| V-31 | 4-CO₂H-phenyl | 3-pyridyl | CH₃ | =CH−C(CH₃)=CH− |
| V-32 | 4-CO₂H-phenyl | CH₃ | CN | =CH−CH=CH− |
| V-33 | 4-CO₂H-phenyl | H | H | =CH−CH=CH− |
| V-34 | 3-Cl-4-CO₂H-phenyl | H | −OC₂H₅ | =CH−CH=CH− |
| V-35 | 4-CO₂H-phenyl | H | (n)C₄H₉− | =CH−CH=CH− |
| V-36 | 3,5-di(CO₂H)phenyl | CH₃ | −NHCH₃ | =CH−CH=CH− |

-continued

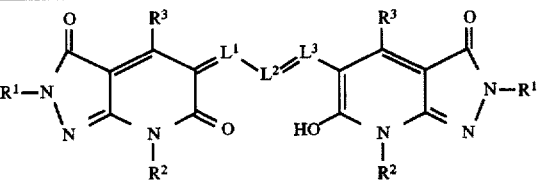

| | R¹ | R² | R³ | =L¹—L²=L³— |
|---|---|---|---|---|
| V-37 |  4-CO₂H-phenyl | —COCH₃ | —NHCOCH₃ | =CH—CH=CH— |
| V-38 | 4-CO₂H-phenyl | —CO₂CH₃ | —NHSO₂CH₃ | =CH—CH=CH— |
| V-39 | 3-CO₂H-phenyl | —CH₂CH₂OH | CH₃ | =CH—CH=CH— |
| V-40 | —CH₂CH₂CN | H | CH₃ | =CH—CH=CH— |
| V-41 | 2-CO₂H-phenyl | H | CH₃ | =CH—CH=CH— |
| V-42 | 4-CO₂H-phenyl | H | C₂H₅ | =CH—CH=CH— |
| V-43 | 4-CO₂H-phenyl | —CH₂CH₂OCH₃ | CH₃ | =CH—C(C₂H₅)=CH— |
| V-44 | 4-CO₂H-phenyl | H | CH₃ | =CH—C(Cl)=CH— |
| V-45 | 4-CO₂H-phenyl | H | CO₂H | =CH—C(CH₃)=CH— |
| V-46 | 4-CO₂H-phenyl | H | CO₂H | =CH—C(Cl)=CH— |
| V-47 | —CH₂CH₂CN | 4-CO₂H-phenyl | CH₃ | =CH—CH=CH— |
| V-48 | —CH₂CH₂CN | 3,5-(CO₂H)₂-phenyl | CH₃ | =CH—CH=CH— |

-continued

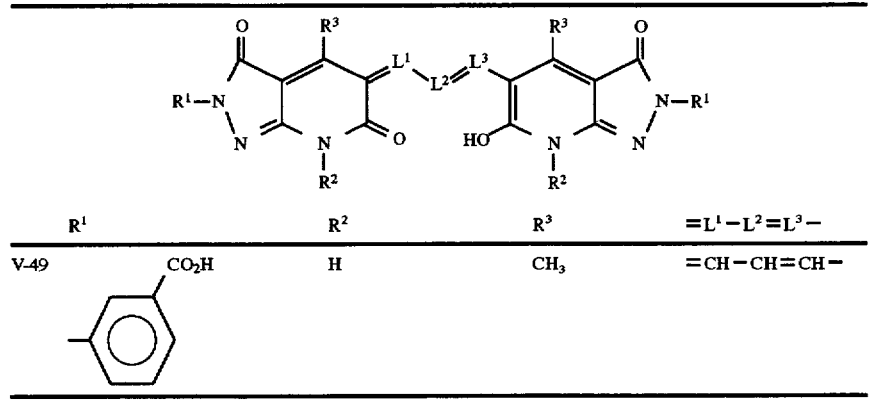

| | R¹ | R² | R³ | =L¹—L²=L³— |
|---|---|---|---|---|
| V-49 | -⟨CO₂H⟩⟨phenyl⟩ | H | CH₃ | =CH—CH=CH— |

The dyes used in the present invention can be synthesized by methods described in PCT International Patent WO88/04794, European Patents EP0274723A1, 276566 and 299435, JP-A-52-92716, JP-A-55-155350, JP-A-55-155351, JP-A-61-205934, JP-A-48-68623, U.S. Pat. Nos. 2,527,583, 3,486,897, 3,746,539, 3,933,798, 4,130,429 and 4,040,841, JP-A-3-282244, JP-A-3-7931 and JP-A-3-167546, or in accordance with these methods.

The dyes represented by formula (II) are preferably used as solid dispersions of fine powders (fine crystalline particles). The dispersions of fine (crystalline) particles of the dyes can be mechanically prepared by use of a known pulverizing means/for example, a ball mill, a vibrating ball mill, a planetary ball mill, a sand mill, a colloid mill or a roller mill) in the presence of a dispersing agent (polyalkylene oxide of formula (I-a) or (I-b)) using an appropriate solvent (such as water or an alcohol) if desired. The details of the preparing methods are described in Kinosei Ganryo Oyo Gijyutu (Application Techniques of Functional Pigments), published by C. M. C. (1991). The photographic material can be provided with a layer containing the finely divided dye by dispersing the fine (crystalline) particles of the dye thus obtained in an appropriate binder, thereby preparing an approximately homogeneous dispersion of solid particles followed by application thereof to a desired support.

There is no particular limitation on the above-described binders, as long as they are hydrophilic colloids which can be used in photosensitive emulsion layers or non-photosensitive layers, but gelatin or synthetic polymers are generally used.

The mean particle size of the fine particles of the dyes contained in the solid dispersions is preferably 0.005 μm to 10 μm, more preferably 0.01 μm to 1 μm, and further more preferably 0.01 μm to 0.5 μm.

The dispersion of fine solid particles of the dye represented by formula (II) used in the present invention is contained in the non-photosensitive hydrophilic colloidal layer in the silver halide photographic material, according to the hue of the dye. In the photographic material provided with a plurality of non-photosensitive layers, it can be contained in these plural layers.

The dye concentration of the dispersions of fine solid particles of the present invention is 0.001 to 0.5 in weight ratio, and preferably 0.02 to 0.3.

The dispersions of fine solid particles of the present invention can be added, for example, to the photographic materials described in JP-A-2-282244.

The present invention provides superior effects by using a compound represented by the general formula (I-a) or (I-b) (hereafter referred to "a block copolymer of the invention") and a compound represented by the following general formula (I) (hereafter referred to "a compound (I) of the invention").

wherein R represents a hydrogen atom, a hydrophobic group or a hydrophobic polymer, P represents a group containing at least one structural unit selected from the group consisting of A, B and C, and having 10 to 3500 of polymerization degree, n represents 1 or 2, and m represents 0 or 1.

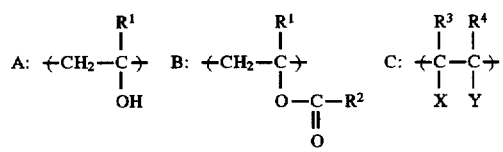

wherein $R^1$ represents a hydrogen atom or an alkyl group having 1 to 6 carbon atoms, $R^2$ represents a hydrogen atom or an alkyl group having 1 to 10 carbon atoms, $R^3$ represents a hydrogen atom or —CH₃, $R^4$ represents a hydrogen atom, —CH₃, —CH₂COOH which may be ammonium salt thereof or metal salt thereof or —CN, X represents a hydrogen atom, —COOH which may be ammonium salt thereof or metal salt thereof or —CONH₂, Y represents —COOH which may be ammonium salt thereof or metal salt thereof, —SO₃H which may be ammonium salt thereof or metal salt thereof, —OSO₃H which may be ammonium salt thereof or metal salt thereof), —CH₂SO₃H which may be ammonium salt thereof or metal salt thereof), —CONHC(CH₃)₂CH₂SO₃H (including ammonium salt thereof and metal salt thereof or —CONHCH₂CH₂CH₂N⁺(CH₃)₃Cl⁻.

The block copolymer and the compound (I) of the invention are used as a dispersing aid in a preparation of the solid dispersion of the invention.

The block copolymer of the invention and the compound (I) of the invention are at least incorporated into the solid dispersion, and preferably added before or during pulverization of the dye. More preferably, the block copolymer of the invention is incorporated before pulverization of the dye and then the compound (I) of the invention is added. Most preferably, after the block copolymer of the invention is added before pulverization of the dye and stirred, and followed by subjecting to heating treatment of the mixture thus obtained, the compound (I) of the invention is added to the heated mixture and stirred to prepare the solid dispersion of the invention.

The solid dispersion of the invention is prepared by wetting the powder of the dye with water or organic solvent to prepare a so-called "wet cake", and then the wee cake thus obtained is stirred under the presence of the dispersing aid of the invention. The heat-treatment is preferably carried out to stabilize the dispersion The treatment is carried out at any time without limitation, but preferably after the pulverization of the dye.

The combination of the block copolymer of the invention and the compound (I) of the invention provides unexpectedly superior effect as compared to a sole use of the block copolymer or the compound (I). The block copolymer and/or the compound (I) may be added at any time, and preferably added on or after a step of fine pulverization of the dye due to the block copolymer of the invention. Further, the compound (I) of the invention is preferably added at least just before storage, since the presence of the compound (I) of the invention contributes to an increase of storage-stabilization. By heating, coagulation hardly occurs at mixing of the solid dispersion and gelatin, and the combination of the heat-treatment and addition of the compound (I) of the invention provides more advantageous effect.

Preferable example of the compound (I) disclosed above includes a random or block copolymer of vinyl alcohol and vinyl ester and a random or block copolymer thereof, containing additionally a third monomer having an anionic group, such as a carboxyl group, which end is modified by an alkyl group or a hydrophobic polymer.

Polyvinyl alcohol(PVA) polymers have been used itself as a protective colloid or used in a blend with water-soluble protein protective colloid such as gelatin to increase a film thickness in a photographic field, as is disclosed in JP-A-63-20349. In the present invention, the compound (I) of the invention is combinatedly used with the dye and the block copolymer of the invention, and thereby it has been found that the stability of the dye dispersion is markedly improved. Further, the dispersion of the present invention can be used in a various kinds of photographic elements, and provides extremely minimized disadvantages, such as lowering of sensitivity.

The words of "combination of the dye, the compound (I) and the block copolymer of the invention" means that the three components are contained in the same layer. That is, the photographic material contains in a layer thereof a dye dispersion prepared under the presence of the compound (I) and the block copolymer of the invention, in which the compound (I) and the block copolymer of the invention are preferably added before, during or after pulverization of the dye.

The stability of the dye dispersion is attained even with elapse of time at room temperature, in a dissolved form, under cooled temperature and in a dried photographic layer. The higher stability provides almost no coagulation and deposition of the dispersed particles and no variation of spectral absorption. In a dried layer, dispersed particles are fixed in a form of fine dispersion, and thereby the dye does not diffuse between layers not to cause color mixing, degradation with elapse of time, lowering of sensitivity of photographic emulsion, latent image fading, latent image sensitization, fog and contract defect.

The present invention effects not to cause disadvantageous influences provided by mutual interaction between the dye, and binders and other additives. For instance, the present invention dissolves the problems such that coating becomes difficult due to coagulation or viscosity increase occurred at mixing with colloidal solution, that spectral absorption is varied not to provide a coating layer having a desired absorption and etc.

The compound (I) of the invention is characterized by that it has relatively larger molecular weight than that of dispersing aid which has been used in a photographic field, such as a surfactant. Surfactant which has been used in the field has generally one group, such as a nonionic alkylene oxide group, e.g., ethyleneoxide; an anionic group, e.g., carboxyl group, sulfonic group, a phosphoric group; a cationic group, e.g., quarternary ammonium salt, and while the compound (I) of the invention has a hydrophilic group having at least one repeating structure of monomer unit having OH group, an anionic group, and a cationic group, the hydrophilic group of repeating structure of the invention being considerably larger than that of the known surfactant. In this way, when a compound has a large hydrophilic moiety and further has poly-anionic group or poly-cationic group, a considerably large electrostatic repulsion is produced between dispersed particles. Thereby, the remarkable effects of the present invention is provided. The compound (I) of the invention is also used as a coating aid, an antistatic agent, a surface-friction controlling agent, a surface-hydrophobicity providing agent.

The hydrophobic group represented by R in the formula (I) includes a aliphatic group, such as an alkyl group, an alkenyl group, an alkinyl group; an aryl group, such as a phenyl group, a naphthyl group; and an alicyclic group, which include a substituted group thereof. The substituent which may be substituted on R includes an aliphatic group, an aryl group, an alicyclic group, a heterocyclic group, a halogen atom, a hydroxy group, a cyano group, a nitro group, N-substituted sulfamoyl group, a carbamoyl group, an acylamino group, an alkylsulfonylamino group, an arylsulfonylamino group, an alkoxy group, an aryloxy group, an aralkyl group, an acyl group.

When the hydrophobic group represented by R in the formula (I) is an alkyl group, it has 3 to 70 carbon atoms, preferably 4 to 50 carbon atoms and more preferably 8 to 24 carbon atoms.

When R represents an alicyclic group, an aryl hydrocarbon group or a hydrophobic polymer group, which may be substituted, the compound (I) provides a high dissolution ability with a hydrophobic photographically useful material to increase dispersion stability of the hydrophobic photographically useful material.

The hydrophobic polymer group represented by R includes a group derived from polystyrene and derivatives thereof; polymethacrylate, e.g., methyl polymethacrylate, and derivatives thereof; polyacrylate and derivatives thereof; water-insoluble vinyl polymer, such as polybutene; polyvinylacetate; vinyl copolymer; water-insoluble polyoxyalkylene, such as polyoxypropylene, polyoxytetramethylene; and water-insoluble polymer, such as polyamide, polyester. Especially, polystyrene and derivatives thereof, polymethacrylate and derivatives thereof, polyacrylate and derivatives thereof and polyvinylchloride are preferred. The polymerization degree of the hydrophobic polymer is preferably 2 to 500, more preferably 2 to 200 and most preferably 2 to 100.

Examples of the hydrophobic group represented by R are shown below, but are not limitative thereto.

| | |
|---|---|
| n-$C_{12}H_{25}-$ | (S-1) |
| $C_{16}H_{33}-$ | (S-2) |
| $C_{12}H_{25}NHCOCH_2-$ | (S-3) |
| $C_{12}H_{25}OCH_2CH_2-$ | (S-4) |
| $(C_{18}H_{37})_2NCH_2CH_2CH_2-$ | (S-5) |
| $C_2H_5SO_2CH_2CH_2-$ | (S-6) |

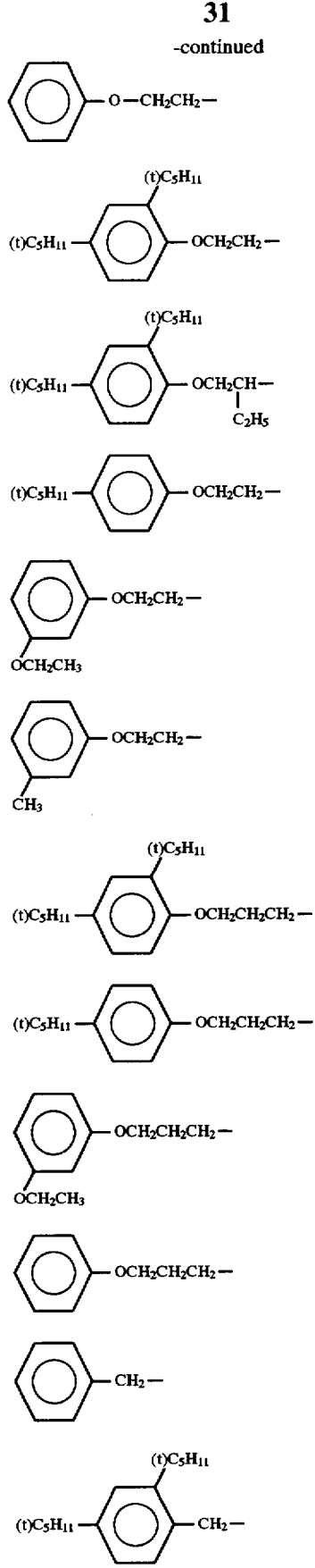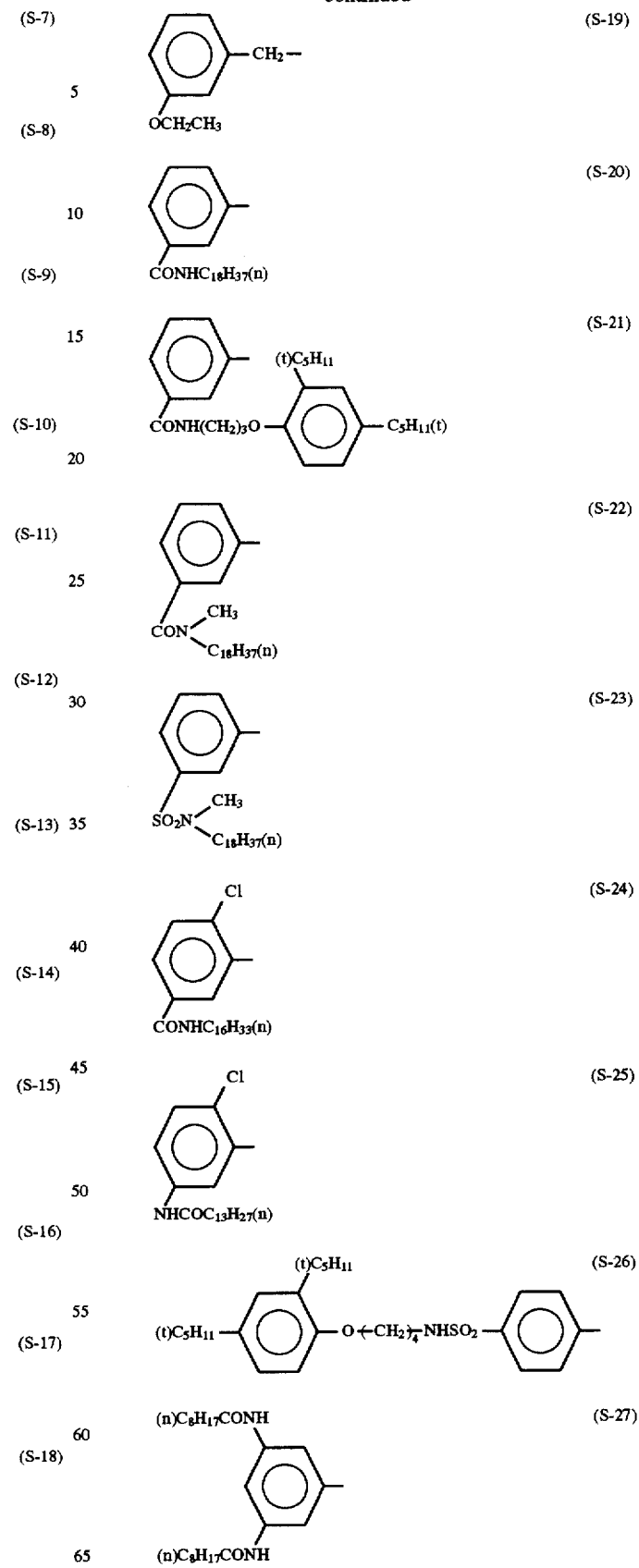

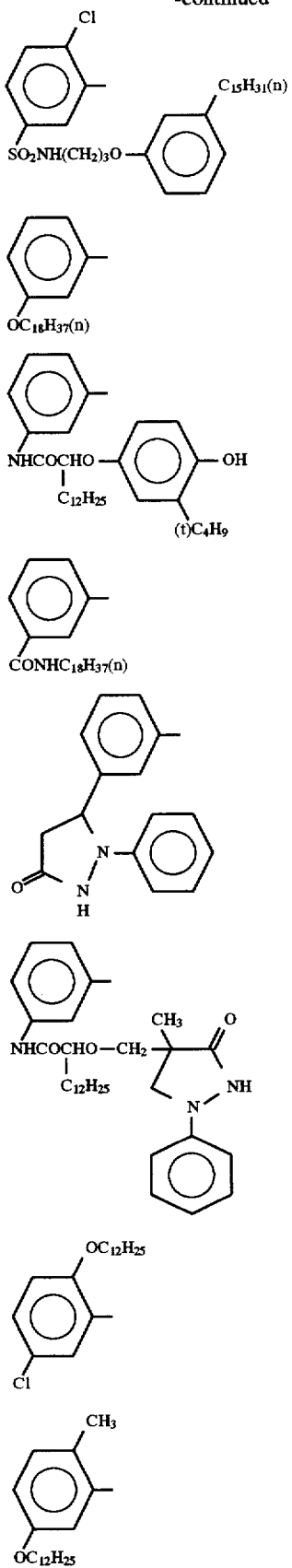
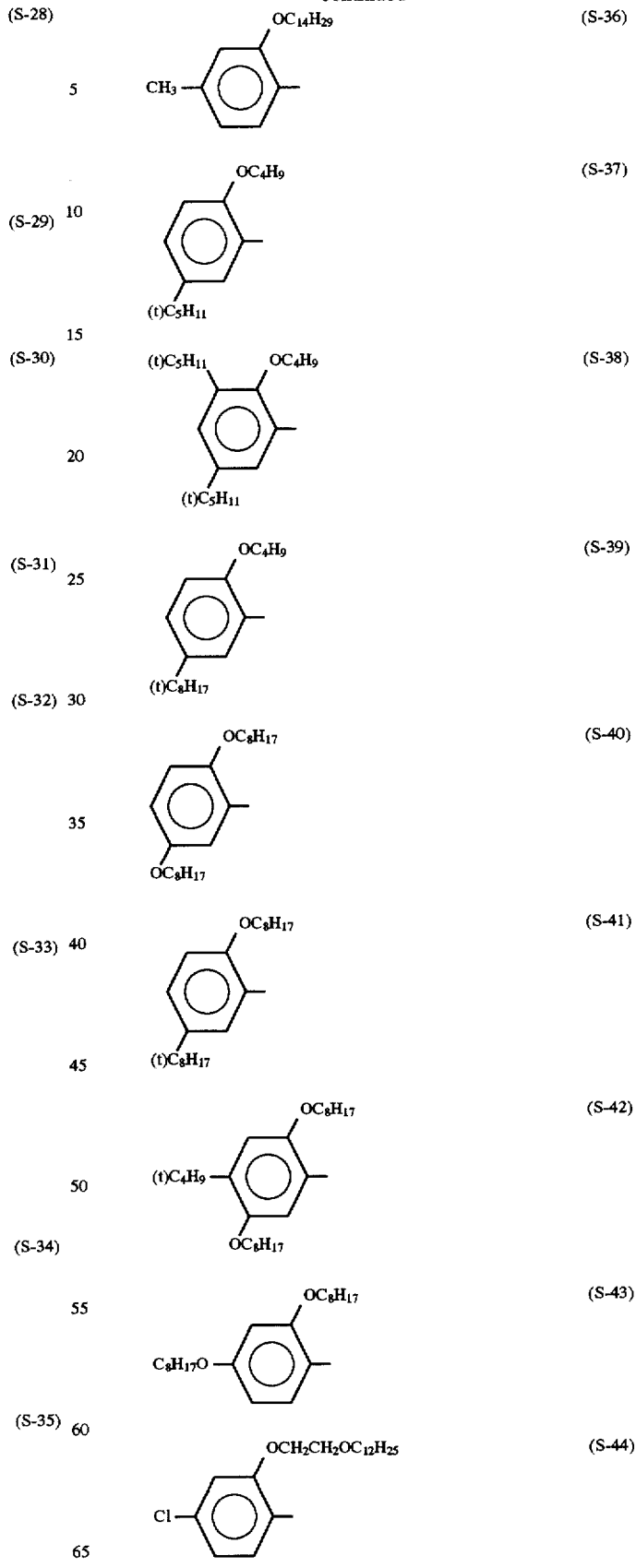

-continued

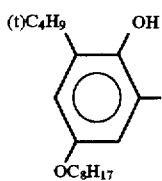

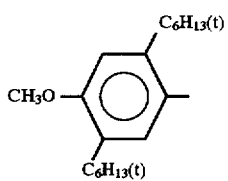

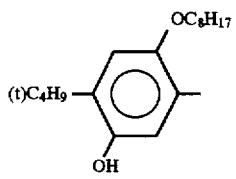

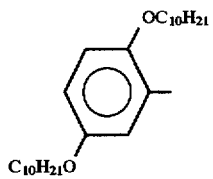

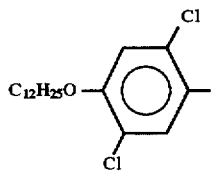

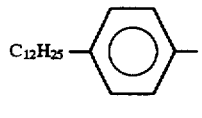

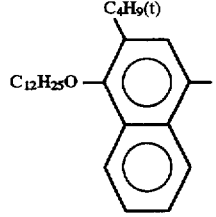

The polymer moiety P in the formula (I) represents at least one structural unit selected from the group consisting of the structural unit A, the structural unit B and the structural unit C.

The structural unit A composing the polymer moiety P includes vinylalcohol, α-methylvinylalcohol, α-propylvinylalcohol.

The structural unit B composing the polymer moiety P includes vinylacetate, vinylformate, vinylpropionate, and α-substituents of them.

The structural unit C composing the polymer moiety P includes a monomer unit which is ion-dissociative in water, such as acryric acid, methacrylic acid or crotonic acid (including ammonium salt thereof, and metal salt thereof, such as sodium salt, potassium salt), maleic acid or itaconic acid (including monoalkylester thereof, ammonium salt thereof and metal salt thereof, such as Na salt, K salt), vinylphosphonate, vinylsulfate, acrylsulfonate, methacrylsulfonate, 2-acrylamido-3-methylpropanesulfonate or 2-methacrylamido-3-methylpropanesulfonate (each including ammonium salt thereof and metal salt thereof, e.g., Na salt, K salt), acrylamidopropyl trimethylammoniumchloride or methacylamidopropyl trimethylammoniumchloride.

Of them, vinylalcohol unit, vinylacetate unit and carboxylic acid unit (including ammonium salt thereof or metal salt thereof, such as Na salt, K salt) are preferred as a structural unit A, a structural unit B and a structural unit C, respectively.

The used amount of the structural units, A, B and C composing the polymer moiety P is not limitative, but preferably the amount of the structural unit A is 50 mol % to 100 mol % so that the polymer moiety P is water-soluble or water-dispersible when the amount of the structural unit C is 1 mol % or less.

The compound (I) of the invention is selected in a broad range of water-soluble compounds and water-dispersible compounds. The polymer moiety P may contain other structural unit than the structural units A, B and C, as long as the compound (I) is water-soluble or water-dispersible. The structural unit other than the structural units A, B and C includes a unit of, for example, ethylene, propylene, isobutene, acrylonitrile, acrylamide, methacrylamide, N-vinyl pyrrolidone, vinylchloride and vinylfluoride.

The polymerization degree of the polymer moiety P is 10 to 3500, preferably 10 to 2000, more preferably 10 to 1000 and most preferably 10 to 500.

The lower alkyl group represented by $R^2$ in the structural units A and B of the polymer moiety P includes an alkyl group having 1 to 10 carbon atoms, and preferably methyl group. The alkyl group may be substituted by a hydroxy group, an amido group, a carboxyl group, a sulfonic acid group, sulfinic acid group, a sulfonamido group.

The compound (I) of the invention have an optimal chemical composition in P and R, and molecular weight, according to the objects of the invention. In attaining any objects, the compound (I) of the invention having a weight ratio of R to P within the range of from 0.001 to 2 ($0.001 \leq R/P \leq 2$), and more preferably from 0.01 to 1 ($0.01 \leq R/P \leq 1$) is preferable to provide remarkable effects.

Examples of the compound (I) are shown below, but not limitative thereto.

TABLE (i)

| Compound No. | R | Polymerization Degree | P A[*1] Content Ratio (mol %) | P B[*2] Content Ratio (mol %) | P C Content Ratio (mol %) | | Polymerization Degree | n[*3] | m[*3] |
|---|---|---|---|---|---|---|---|---|---|
| P-1 | (S-1) | — | 98 | 2 | — | | 300 | 1 | 1 |
| P-2 | (S-1) | — | 88 | 12 | — | | 300 | 1 | 1 |
| P-3 | (S-1) | — | 98 | 2 | — | | 200 | 1 | 1 |
| P-4 | $nC_4H_9$ | — | 90 | 10 | — | | 78 | 1 | 1 |
| P-5 | $tC_3H_{18}$ | — | 88 | 12 | — | | 88 | 1 | 1 |
| P-6 | $nC_{30}H_{61}$ | — | 88 | 12 | — | | 750 | 1 | 1 |
| P-7 | $nC_{18}H_{37}$ | — | 98 | 2 | — | | 260 | 1 | 1 |
| P-8 | $C_{12}H_{25}$ (branched) | — | 98 | 2 | — | | 300 | 1 | 1 |
| P-9 | Methyl Pollymethacrylate | 22 | 94.5 | 2.5 | $+CH_2-CH+\ CH_3$ <br> $\quad\quad\quad\ \ \ \|\quad\quad\ \|$ <br> $\quad\quad\quad\ \ CONHC-CH_2SO_3Na$ <br> $\quad\quad\quad\quad\quad\ \ \ \|$ <br> $\quad\quad\quad\quad\quad\ \ CH_3$ | 3.0 | 110 | 1 | 1 |
| P-10 | Polystyrene | 20 | 93.6 | 1.4 | $+CH_2-CH+$ <br> $\quad\quad\quad\ \ \|$ <br> $\quad\quad\quad COONa$ | 5.0 | 150 | 1 | 1 |
| P-11 | Polyoxypropylene | 55 | 79.1 | 15.9 | $CH_2COONa$ <br> $\|$ <br> $+CH_2-C+$ <br> $\quad\quad\quad\ \|$ <br> $\quad\quad COONa$ | 5.0 | 440 | 1 | 1 |
| P-12 | Polystyrene | 10 | 89.7 | 0.3 | Same as above | 10.0 | 45 | 1 | 1 |
| P-13 | Polystyrene | 10 | 0 | 70.0 | $+CH_2-CH+\ CH_3$ <br> $\quad\quad\quad\ \ \|\quad\quad\ \|$ <br> $\quad\quad\quad CONH-C-CH_2SO_3Na$ <br> $\quad\quad\quad\quad\quad\quad\ \|$ <br> $\quad\quad\quad\quad\quad\quad CH_3$ | 30.0 | 105 | 2 | 1 |
| P-14 | Polyoxypropylene | 50 | 95.6 | 2.4 | $+CH_2-CH+\ CH_3$ <br> $\quad\quad\quad\ \ \|\quad\quad\ \|$ <br> $\quad\quad\quad CONH-C-CH_2SO_3Na$ <br> $\quad\quad\quad\quad\quad\quad\ \|$ <br> $\quad\quad\quad\quad\quad\quad CH_3$ | 2.0 | 110 | 2 | 1 |
| P-15 | Polystyrene | 20 | 95.4 | 1.6 | $CH_2COONa$ <br> $\|$ <br> $+CH_2-C+$ <br> $\quad\quad\quad\ \|$ <br> $\quad\quad COONa$ | 3.0 | 85 | 2 | 1 |
| P-16 | Polystyrene | 20 | 88 | 2 | Same as above | 5.0 | 300 | 1 | 1 |
| P-17 | Methyl Polymethacrylate | 30 | 88 | 2 | Same as above | 7.5 | 300 | 1 | 1 |
| P-18 | n-Butyl Polyacrylate | 30 | 88 | 2 | Same as above | 10.0 | 300 | 1 | 1 |
| P-19 | (S-1) | — | 88 | 2 | Same as above | 10.0 | 400 | 1 | 1 |
| P-21 | (S-1) | — | 88 | 2 | Same as above | 7.5 | 300 | 1 | 1 |
| P-22 | (S-1) | — | 88 | 2 | Same as above | 5.0 | 300 | 1 | 1 |
| P-23 | n-Butyl Polymethacrylate | 10 | 98 | 2 | — | | 300 | 1 | 1 |
| P-24 | Polystyrene | 20 | 98 | 2 | — | | 300 | 1 | 1 |
| P-25 | (S-7) | — | 98 | 2 | — | | 180 | 1 | 1 |
| P-26 | (S-8) | — | 98 | 2 | — | | 110 | 1 | 1 |
| P-27 | (S-10) | — | 98 | 2 | — | | 190 | 1 | 1 |
| P-28 | (S-18) | — | 98 | 2 | — | | 88 | 1 | 1 |
| P-29 | (S-27) | — | 98 | 2 | — | | 200 | 1 | 1 |
| P-30 | (S-50) | — | 98 | 2 | — | | 200 | 1 | 1 |
| P-31 | (S-39) | — | 93 | 2 | $CH_2COONa$ <br> $\|$ <br> $+CH_2C+$ <br> $\quad\quad\ \|$ <br> $\quad COOH$ | 5.0 | 400 | 1 | 1 |
| P-32 | (S-50) | — | 93 | 2 | Same as above | | 400 | 1 | 1 |
| P-33 | (S-1 | — | 93 | 2 | $+CH+\!\!-\!\!-\!\!-\!\!CH+$ <br> $\quad\ \|\quad\quad\quad\ \|$ <br> $\ COONa\ \ COONa$ | 5.0 | 300 | 1 | 1 |
| P-34 | (S-39) | — | 93 | 2 | Same as above | | 300 | 1 | 1 |

TABLE (i)-continued

| Compound No. | R | Polymerization Degree | A*1 Content Ratio (mol %) | B*2 Content Ratio (mol %) | C Content Ratio (mol %) | Polymerization Degree | n*3 | m*3 |
|---|---|---|---|---|---|---|---|---|
| P-35 | (S-50) | — | 93 | 2 | Same as above | 300 | 1 | 1 |
| P-36 | Polystyrene | 20 | 93 | 2 | Same as above | 300 | 1 | 1 |
| P-37 | H | — | 97 | 2 | 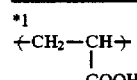 | 1 | 400 | 1 | 0 |
| P-38 | H | — | 88 | 12 | — | 300 | 1 | 0 |
| P-39 | H | — | 88 | 10 | 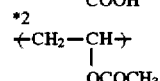 | 2 | 300 | 1 | 0 |

*1
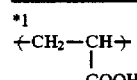

*2
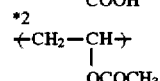

*3
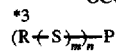

The used amount of the compound (I) of the invention depends on a property and an amount of the dye used, and is generally 0.002 to 20 g/m², preferably 0.004 to 10 g/m², and more preferably 0.004 to 5 g/m². The compound (I) is generally used in an amount of 0.5 to 700 weight %, preferably 1 to 100 weight % and more preferably 2 to 40 weight % based on the amount of the dye.

The compound (I) of the invention is synthesized by a process disclosed in, for example, JP-A-62-288643, JP-A-61-254237, JP-A-61-254238, JP-A-61-254239 and JP-A-61-254240. The compound (I) in which the polymer moiety R is an alkyl group is commercially available, for example, MP-103, MP-203, MP-102 made by Kabushiki Kaisha Kurare.

EXAMPLE 1

Preparation of Solid Dispersions of Dyes

A wet cake of each of the dyes shown in Table A was added so as to give a net dye amount of 8.35 g, and each of the following dispersing aids of the invention or for comparison was added thereto. Water was further added to bring the weight of a mixture up to 83.5 g. Then, the mixture was place in a "batch type sand grinder mill" manufactured by AIMEX K. K. After 218 g of dealkalified glass beads (1 mm in diameter) was added thereto, the content was pulverized at a peripheral speed of about 5 m/second for 4.5 hours.

Dispersing Aids for Comparison
(A)

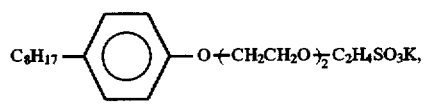

(B)

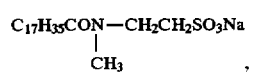

(C) Polyvinyl alcohol, average molecular weight: 20,000 saponification degree: 98%

(D) Polyvinylpyrrolidone, average molecular weight: 20,000

Dispersing Aids of the Invention

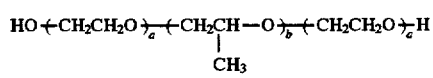

| | Weight Ratio of Polyethylene Oxide | Average Molecular Weight |
|---|---|---|
| (VI) | 0.8 | 11,800 |
| (VII) | 0.7 | 6,600 |
| (VIII) | 0.5 | 4,600 |
| (IX) | 0.8 | 8,400 |

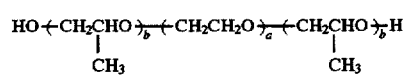

| | Weight Ratio of Polyethylene Oxide | Average Molecular Weight |
|---|---|---|
| (X) | 0.8 | 8,600 |

The content was taken out of the mill, and the beads were filtered off to obtain a dispersion.

Evaluation of Properties of Dispersions

The average particle size, spectral absorption and viscosity of the resulting dispersions are shown in Table A.

The measuring methods thereof are as follows:

Average Particle Size

The dispersion was diluted with ion-exchanged water, and the measurement was made by use of a particle size measuring device according to laser beam diffraction scattering.

Spectral Absorption

The dispersion was diluted with ion-exchanged water to make a dye concentration of 0.002% by weight, and the maximum absorbance in the visible region or the absorbance at 600 nm was measured.

Viscosity

An RV2 manufactured by Haake was used. A cell was filled with 6% by weight of the dye dispersion, and the shear rate was increased to 0–1000 sec$^{-1}$ for 1 second. After keeping for 0.1 second, it was decreased to 1000–0 sec$^{-1}$. In this case, the viscosity at the time when the shear rate was increased and 100 sec$^{-1}$ was taken as $\eta^1$, the viscosity at the time when the shear rate was 600 sec$^{-1}$ was taken as $\eta^2$ and the viscosity at the time when the shear rate was decreased and 100 sec$^{-1}$ was taken as $\eta^3$.

$\eta^1$ relatively larger than $\eta^2$ results in higher non-Newtonian property (higher dependency of the viscosity on the shear rate), and $\eta^1$ relatively larger than $\eta^3$ results in more significant thixotropy (time dependency of the viscosity).

TABLE A

| Sample No. | Dye | Dispersing Aids Kind | Amount Used (% by weight based on dye) | Average Particle Size (µm) | Spectral Absorption Dmax | Spectral Absorption D600 nm | Viscosity (mPas) $\eta^1$ | Viscosity (mPas) $\eta^2$ | Viscosity (mPas) $\eta^3$ |
|---|---|---|---|---|---|---|---|---|---|
| Dispersion for Comparison 1a | II-13 | Compound for Comparison A | 20 | 0.70 | 0.8 | — | 85 | 30 | 55 |
| Dispersion for Comparison 1-b | II-13 | Compound for Comparison B | 20 | 0.68 | 0.8 | — | 86 | 31 | 54 |
| Dispersion for Invention 1-1 | II-13 | Compound for Invention VI | 20 | 0.55 | 0.9 | — | 65 | 29 | 48 |
| Dispersion for Invention 1-2 | II-13 | Compound for Invention VII | 20 | 0.55 | 0.9 | — | 65 | 27 | 48 |
| Dispersion for Comparison 1-c | III-11 | Compound for Comparison A | 20 | 0.60 | 1.0 | — | 45 | 20 | 42 |
| Dispersion for Comparison 1-d | III-11 | Compound for Comparison B | 20 | 0.62 | 0.95 | — | 55 | 20 | 50 |
| Dispersion for Invention 1-3 | III-11 | Compound for Invention VI | 20 | 0.50 | 1.12 | — | 32 | 18 | 32 |
| Dispersion for Invention 1-4 | III-11 | Compound for Invention VII | 20 | 0.50 | 1.13 | — | 33 | 18 | 32 |
| Dispersion for Comparison 1-e | IV-3 | Compound for Comparison A | 20 | 0.61 | 0.50 | — | 90 | 25 | 40 |
| Dispersion for Comparison 1-f | IV-3 | Compound for Comparison B | 20 | 0.77 | 0.59 | — | 95 | 25 | 42 |
| Dispersion for Invention 1-5 | IV-3 | Compound for Invention VI | 20 | 0.33 | 1.32 | — | 50 | 20 | 40 |
| Dispersion for Invention 1-6 | IV-3 | Compound for Invention VII | 20 | 0.31 | 1.34 | — | 50 | 18 | 38 |
| Dispersion for Comparison 1-g | IV-18 | Compound for Comparison A | 20 | 0.40 | 0.82 | — | 95 | 25 | 42 |
| Dispersion for Invention 1-7 | IV-18 | Compound for Invention VI | 20 | 0.38 | 0.91 | — | 45 | 20 | 35 |
| Dispersion for Invention 1-8 | IV-18 | Compound for Invention VII | 20 | 0.35 | 0.94 | — | 40 | 20 | 35 |
| Dispersion for Comparison 1-h | V-1 | Compound for Comparison A | 20 | 0.87 | — | 0.83 | 100 | 24 | 40 |
| Dispersion for Comparison 1-i | V-1 | Compound for Comparison B | 20 | 0.78 | — | 0.77 | 100 | 25 | 45 |
| Dispersion for Comparison 1-j | V-1 | Compound for Comparison C | 20 | 0.49 | — | 0.83 | 120 | 90 | 120 |
| Dispersion for Comparison 1-k | V-1 | Compound for Comparison D | 20 | 0.73 | — | 0.77 | 115 | 95 | 115 |
| Dispersion for Invention 1-9 | V-1 | Compound for Invention VI | 20 | 0.32 | — | 1.14 | 57 | 21 | 57 |
| Dispersion for Invention 1-10 | V-1 | Compound of Invention VII | 20 | 0.32 | — | 1.14 | 60 | 20 | 60 |
| Dispersion for Invention 1-11 | V-1 | Compound of Invention VIII | 20 | 0.38 | — | 1.12 | 60 | 20 | 60 |
| Dispersion for Invention 1-12 | V-1 | Compound of Invention IX | 20 | 0.38 | — | 1.12 | 59 | 20 | 59 |
| Dispersion for Invention 1-13 | V-1 | Compound of Invention VI | 5 | 0.38 | — | 1.00 | 57 | 20 | 56 |
| Dispersion for Invention 1-14 | V-1 | Compound of Invention VI | 10 | 0.32 | — | 1.13 | 58 | 20 | 58 |
| Dispersion for Invention 1-15 | V-1 | Compound of Invention VI | 50 | 0.38 | — | 1.14 | 60 | 30 | 60 |
| Dispersion for Invention 1-16 | V-1 | Compound of Invention VI | 100 | 0.45 | — | 1.00 | 85 | 33 | 80 |
| Dispersion for Invention 1-17 | V-1 | Compound of Invention X | 20 | 0.34 | — | 1.14 | 59 | 20 | 59 |

The results shown in Table A reveals that the dispersions of the present invention comprise fine grains and are high in spectral absorption, low in viscosity and low in shear rate dependency of the viscosity and time dependency thereof.

That is, the dispersions of the present invention are low in non-Newtonian property and thixotropy.

EXAMPLE 2

Preparation of Solid Dispersions of Dyes

A wet cake of each of the dyes shown in Table B was added so as to give a net dye amount of 180 g. and each of the dispersing aids of the invention or for comparison shown in Table B was added thereto. Water was further added to bring the weight of a mixture up to 2,000 g. Then, the mixture was dispersed in a "continuous flow type sand grinder mill" manufactured by AIMEX K. K. The mill was filled with 2,000 ml of dealkalified glass beads (1 mm in diameter), followed by pulverization at a peripheral speed of about 7 m/second at a discharge of 0.5 liter/minute for 7 hours.

The average particle size of the resulting dispersions and the apparent volume of liquid after dispersion are shown in Table B.

TABLE B

| Sample No. | Dye | Dispersing Aid Kind | Amount Used (*) | Average Particle Size (μm) | Vol. after Dispersion / Vol. before Dispersion |
| --- | --- | --- | --- | --- | --- |
| Dispersion for Comparison 2-a | III-1 | Compound for Comparison A | 20 | 0.60 | 2 |
| Dispersion of Invention 2-1 | III-1 | Compound of Invention VI | 20 | 0.50 | 1.0 |
| Dispersion for Comparison 2-b | V-1 | Compound for Comparison A | 20 | 0.60 | 1.8 |
| Dispersion of Invention 2-2 | V-1 | Compound of Invention VI | 20 | 0.50 | 1.0 |

*% by weight based on the dye

The results shown in Table B reveals that the dispersions of the present invention provide no bubble entrainment and are not deteriorated in dispersion efficiency.

EXAMPLE 3

Heating of Solid Dispersion of Dyes

Dispersions of the dyes shown in Table C were heated under the conditions shown in Table C.

The ratios of the average particle sizes after heating to those before heating are shown in Table C.

TABLE C

| Sample No. | Dispersion before Heating | Heating Conditions | Average Particle size after Heating / Average Particle Size before Heating |
| --- | --- | --- | --- |
| Dispersion for Comparison 3-1 | 1-c | 85° C., 6 hours | 1.5 |
| Dispersion for Comparison 3-2 | 1-d | 85° C., 6 hours | 1.2 |
| Dispersion of Invention 3-3 | 1-3 | 85° C., 6 hours | 0.98 |
| Dispersion of Invention 3-4 | 1-4 | 85° C., 6 hours | 1.01 |
| Dispersion for Comparison 3-5 | 1-e | 75° C., 11 hours | 1.2 |
| Dispersion of Invention 3-6 | 1-5 | 75° C., 11 hours | 1.0 |
| Dispersion of Invention 3-7 | 1-6 | 75° C., 11 hours | 0.97 |
| Dispersion for Comparison 3-8 | 1-f | 90° C., 10 hours | 1.1 |
| Dispersion for Comparison 3-9 | 1-g | 90° C., 10 hours | 1.2 |
| Dispersion for Comparison 3-10 | 1-h | 90° C., 10 hours | 1.5 |
| Dispersion for Comparison 3-11 | 1-i | 90° C., 10 hours | 1.5 |
| Dispersion of Invention 3-12 | 1-7 | 90° C., 10 hours | 0.97 |
| Dispersion of Invention 3-13 | 1-8 | 90° C., 10 hours | 1.0 |
| Dispersion of Invention 3-14 | 1-9 | 90° C., 10 hours | 1.0 |
| Dispersion of Invention 3-15 | 1-10 | 90° C., 10 hours | 1.0 |

The results shown in Table C reveals that the dispersions of the present invention are stably dispersed even when they are forcedly heated to give energy.

EXAMPLE 4

Each of the dispersions of fine solid particles of the present invention was added to the photographic material described in Example 2 of JP-A-2-282244. As a result, the dispersions did not migrate between colloidal layers during storage, were photochemically inactive, had excellent light absorption characteristics, and were decolored and/or eluted so as not to generate residual color staining at the time of development.

When produced by pulverization according to the present invention, the dispersions of fine solid dye particles high in light absorption characteristics, low in viscosity, having no non-Newtonian property and reduced in bubble entrainment, namely having preferable production suitability, and having good dispersion stability were obtained.

EXAMPLE 5

Preparation of Solid Fine Particle Dispersion

A wet-cake of water-insoluble photographically useful compound shown in the following Table D was added so as to give a net dye amount of 8.35 g. and each of the following dispersing aid of the invention or for comparison was added thereto (the dispersing aid was one added at pulverization of the dye). Water was further added to make the weight of 139 g. and the mixture thus obtained was placed in a "batch type sand grinder mill" (made by AIMEX K.K.). After addition of 400 ml of zirconia beads having 0.5 nun diameter, the content was pulverized at a peripheral speed of about 5 m/second for 4.5 hours.

Dispersing Aid for Comparison (A)

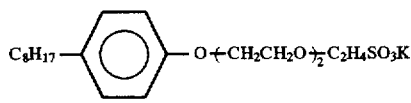

(B)

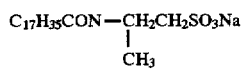

(E) Sodium salt of carboxymethylcellulose Average molecular weight 15,000 Etherification degree 0.7–0.8

(F)

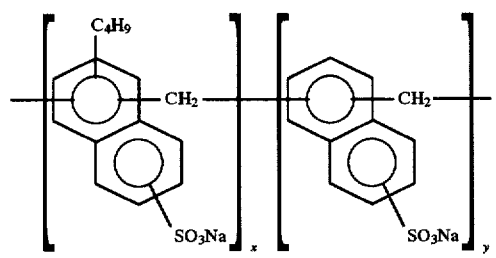

x/y = 75/25 (molar fraction) − 73 Average molecular weight 3,900

Dispersing Aid of the Invention

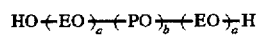

| | Polyethyleneoxide (weight ratio) | Average molecular weight |
|---|---|---|
| (VII) | 0.8 | 11,400 |
| (VIII) | 0.7 | 6,600 |
| (IX) | 0.5 | 4,600 |
| (X) | 0.8 | 8,400 |

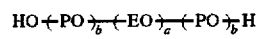

| | Polyethyleneoxide (weight ratio) | Average molecular weight |
|---|---|---|
| (XI) | 0.8 | 8,600 |

The content was taken out of the mill, and the beads were filtered off to obtain a dispersion. The dispersion thus obtained was diluted so as to be 3 weight % of the compound concentration. The diluted dispersion was heated under the conditions shown in the following Table D, and then dispersing aid of the invention shown in the following Table D (the dispersing aid was one added after heat-treatment was added).

TABLE D

| Solid Fine Dispersion | Water-soluble Photographically Useful Compound(*) | Dispersing Aids Added at Pulverization Kind | Amount used (% by weight based on (*)) | Heat Condition | Dispersion Aids Added After Heating Kind | Amount used (% by weight based on (*)) |
|---|---|---|---|---|---|---|
| Dispersion for Comparison 1-a | II-13 | Compound for Comparison A | 20 | No heating | — | — |
| Dispersion of Invention 1-1 | II-13 | Compound of Invention VII | 20 | No heating | P-15 | 3 |
| Dispersion for Comparison 1-b | III-11 | Compound for Comparison A | 20 | No heating | — | — |
| Dispersion of Invention 1-2 | III-11 | Compound of Invention VII | 20 | No heating | P-31 | 3 |
| Dispersion for Comparison 1-c | IV-3 | Compound for Comparison A | 30 | 85° C., 11 hrs. | — | — |
| Dispersion for Comparison 1-d | IV-3 | Compound for Comparison E | 30 | 85° C., 11 hrs. | — | — |
| Dispersion for Comparison 1-e | IV-3 | Compound for Comparison A | 30 | 85° C., 11 hrs. | P-1 | 5 |
| Dispersion for Comparison 1-f | IV-3 | Compound for Comparison E | 30 | 85° C., 11 hrs. | P-1 | 5 |
| Dispersion for Comparison 1-g | IV-3 | Compound of Invention VII | 30 | 85° C., 11 hrs. | — | — |
| Dispersion of Invention 1-3 | IV-3 | Compound of Invention VII | 30 | 85° C., 11 hrs. | P-1 | 5 |
| Dispersion for Comparison 1-h | V-1 | Compound for Comparison A | 20 | 90° C., 10 hrs. | — | — |
| Dispersion for Comparison 1-i | V-1 | Compound for Comparison B | 20 | 90° C., 10 hrs. | — | — |
| Dispersion for Comparison 1-j | V-1 | Compound for Comparison E | 20 | 90° C., 10 hrs. | — | — |
| Dispersion for Comparison 1-k | V-1 | Compound for Comparison F | 20 | 90° C., 10 hrs. | — | — |
| Dispersion for Comparison 1-l | V-1 | Compound for Comparison F | 20 | 90° C., 10 hrs. | P-2 | 3 |
| Dispersion for Comparison 1-m | V-1 | Compound of Invention VII | 20 | 90° C., 10 hrs. | — | — |
| Dispersion of Invention 1-4 | V-1 | Compound of Invention VII | 20 | 90° C., 10 hrs. | P-2 | 1 |
| Dispersion of Invention 1-5 | V-1 | Compound of Invention VII | 20 | 90° C., 10 hrs. | P-2 | 3 |
| Dispersion of Invention 1-6 | V-1 | Compound of Invention VII | 20 | 90° C., 10 hrs. | P-2 | 10 |
| Dispersion of Invention 1-7 | V-1 | Compound of Invention VII | 20 | 90° C., 10 hrs. | P-2 | 50 |
| Dispersion of Invention 1-8 | V-1 | Compound of Invention VII | 5 | 90° C., 10 hrs. | P-2 | 3 |
| Dispersion of Invention 1-9 | V-1 | Compound of Invention VII | 10 | 90° C., 10 hrs. | P-2 | 3 |
| Dispersion of Invention 1-10 | V-1 | Compound of Invention VII | 100 | 90° C., 10 hrs. | P-2 | 3 |
| Dispersion of Invention 1-11 | V-1 | Compound of Invention VII Compound of Invention P-2 | 20 | 90° C., 10 hrs. | — | — |
| Dispersion of Invention 1-12 | V-1 | Compound of Invention VIII | 20 | 90° C., 10 hrs. | P-2 | 3 |
| Dispersion of Invention 1-13 | V-1 | Compound of Invention IX | 20 | 90° C., 10 hrs. | P-2 | 3 |
| Dispersion of Invention 1-14 | V-1 | Compound of Invention X | 20 | 90° C., 10 hrs. | P-2 | 3 |
| Dispersion of Invention 1-15 | V-1 | Compound of Invention XI | 20 | 90° C., 10 hrs. | P-2 | 3 |

Evaluation in Change of Dispersion with Elapse of Time at Room temperature

The dispersion thus obtained was allowed to stand at room temperature, and after standing, the average particle size, spectral absorption and an occurrence of coagulation were evaluated. The results are shown in the following Table E. The method for evaluation is as follows.

Average Particle Size

The dispersion was diluted with ion-exchanged water and subjected to particle size measuring device according to laser beam diffraction scattering method.

Spectral Absorption

The dispersion was diluted with ion-exchanged water to make a dye concentration of 0.002% by weight, and absorbance at 400 nm to 900 nm was measured using a spectrometer.

Occurrence of Coagulation

After stirring the dispersion, 30 g of the dispersion was filtered, and the residue was visually examined.

temperature and no fluctuation in spectral absorption to form a dispersion having an excellent dispersion stability.

[Stability of Colloidal Dispersion]

A dispersion shown in the following Table F was mixed with a colloidal solution with the following composition ratio at a temperature of 40° C.

| Solid fine particle dispersion Colloidal solution | 800 g |
|---|---|
| Acid-treated gelatin | 180 g |
| Water | 1677 g |
| Sodium 1-oxy-3,5-dichloro-s-triazine | 0.347 g |

TABLE E

| Solid Fine Dispersion | Average particle Size (μm) (ratio) | | | Dmax (ratio) | | | Dmax + 200 nm/Dmax | | D 470 nm/Dmax | | Coagulation** |
|---|---|---|---|---|---|---|---|---|---|---|---|
| | Before Still-standing (A) | After Still-standing for 6 Months (B) | B/A | Before Still-standing (A) | After Still-standing for 6 Months (B) | B/A | Before Still-standing | After Still-standing for 6 Months | Before Still-standing | After Still-standing for 6 Months | |
| Dispersion for Comparison 1-a | 0.69 | 0.79 | 1.14 | 0.81 | 0.71 | 0.88 | 0.14 | 0.16 | —* | — | o |
| Dispersion of Invention 1-1 | 0.53 | 0.53 | 1.00 | 0.91 | 0.91 | 1.00 | 0.10 | 0.10 | — | — | x |
| Dispersion for Comparison 1-b | 0.59 | 0.69 | 1.17 | 1.01 | 0.91 | 0.90 | 0.14 | 0.16 | — | — | o |
| Dispersion of Invention 1-2 | 0.49 | 0.49 | 1.00 | 1.13 | 1.13 | 1.00 | 0.12 | 0.12 | — | — | x |
| Dispersion for Comparison 1-c | 0.60 | 0.66 | 1.10 | 1.01 | 0.91 | 0.90 | 0.16 | 0.23 | — | — | o |
| Dispersion for Comparison 1-d | 0.75 | 0.82 | 1.09 | 0.96 | 0.86 | 0.90 | 0.16 | 0.23 | — | — | x |
| Dispersion for Comparison 1-e | 0.58 | 0.61 | 1.05 | 1.11 | 1.02 | 0.92 | 0.15 | 0.20 | — | — | o |
| Dispersion for Comparison 1-f | 0.60 | 0.63 | 1.05 | 1.10 | 1.00 | 0.91 | 0.16 | 0.23 | — | — | x |
| Dispersion for Comparison 1-g | 0.56 | 0.58 | 1.04 | 1.13 | 1.08 | 0.96 | 0.12 | 0.16 | — | — | x |
| Dispersion of Invention 1-3 | 0.56 | 0.56 | 1.00 | 1.13 | 1.13 | 1.00 | 0.12 | 0.12 | — | — | x |
| Dispersion for Comparison 1-h | 0.85 | 0.93 | 1.09 | 0.93 | 0.83 | 0.89 | 0.68 | 0.78 | 0.47 | 0.40 | o |
| Dispersion for Comparison 1-i | 0.76 | 0.83 | 1.09 | 0.87 | 0.77 | 0.89 | 0.68 | 0.78 | 0.47 | 0.40 | o |
| Dispersion for Comparison 1-j | 0.50 | 0.55 | 1.10 | 0.93 | 0.83 | 0.89 | 0.68 | 0.76 | 0.47 | 0.42 | o |
| Dispersion for Comparison 1-k | 0.70 | 0.76 | 1.09 | 0.87 | 0.77 | 0.89 | 0.70 | 0.78 | 0.45 | 0.41 | o |
| Dispersion for Comparison 1-l | 0.70 | 0.73 | 1.04 | 0.87 | 0.83 | 0.95 | 0.70 | 0.75 | 0.45 | 0.43 | x |
| Dispersion for Comparison 1-m | 0.32 | 0.33 | 1.03 | .116 | 1.14 | 0.98 | 0.65 | 0.68 | 0.48 | 0.46 | x |
| Dispersion of Invention 1-4 | 0.32 | 0.33 | 1.03 | 1.16 | .114 | 0.98 | 0.65 | 0.68 | 0.48 | 0.46 | x |
| Dispersion of Invention 1-5 | 0.32 | 0.32 | 1.00 | 1.16 | 1.16 | 1.00 | 0.65 | 0.65 | 0.48 | 0.48 | x |
| Dispersion of Invention 1-6 | 0.32 | 0.32 | 1.00 | 1.16 | 1.16 | 1.00 | 0.65 | 0.65 | 0.48 | 0.48 | x |
| Dispersion of Invention 1-7 | 0.32 | 0.33 | 1.03 | 1.16 | 1.14 | 0.98 | 0.65 | 0.68 | 0.48 | 0.46 | x |
| Dispersion of Invention 1-8 | 0.37 | 0.38 | 1.03 | 1.14 | 1.12 | 0.99 | 0.65 | 0.65 | 0.48 | 0.48 | x |
| Dispersion of Invention 1-9 | 0.32 | 0.32 | 1.00 | 1.16 | 1.16 | 1.00 | 0.65 | 0.65 | 0.48 | 0.48 | x |
| Dispersion of Invention 1-10 | 0.44 | 0.45 | 1.02 | 1.00 | 0.97 | 0.97 | 0.65 | 0.68 | 0.48 | 0.45 | x |
| Dispersion of Invention 1-11 | 0.32 | 0.32 | 1.00 | 1.16 | 1.16 | 1.00 | 0.65 | 0.65 | 0.48 | 0.48 | x |
| Dispersion of Invention 1-12 | 0.32 | 0.32 | 1.00 | 1.16 | 1.16 | 1.00 | 0.65 | 0.65 | 0.48 | 0.48 | x |
| Dispersion of Invention 1-13 | 0.37 | 0.37 | 1.00 | 1.14 | 1.14 | 1.00 | 0.65 | 0.65 | 0.48 | 0.48 | x |
| Dispersion of Invention 1-14 | 0.37 | 0.37 | 1.00 | 1.14 | 1.14 | 1.00 | 0.65 | 0.65 | 0.48 | 0.48 | x |
| Dispersion of Invention 1-15 | 0.33 | 0.33 | 1.00 | 1.15 | 1.15 | 1.00 | 0.65 | 0.65 | 0.48 | 0.48 | x |

*not evaluated
**o: coagulated
***x: not coagulated

From the results in Table E, it is apparent that the dispersion of the invention provides no coagulation at room

TABLE F

| Solid Fine Dispersion | Coagulation | Dmax Before storing | Dmax After storing | Dmax + 200 nm/Dmax Before storing | Dmax + 200 nm/Dmax After storing | D 470 nm/Dmax Before storing | D 470 nm/Dmax After storing | Viscosity [mPas] Before storing | Viscosity [mPas] After storing |
|---|---|---|---|---|---|---|---|---|---|
| Dispersion for Comparison 1-k | o | 0.87 | 0.80 | 0.80 | 1.13 | 0.40 | 0.27 | 80 | 400 |
| Dispersion for Comparison 1-l | o | 0.87 | 0.81 | 0.80 | 1.10 | 0.40 | 0.30 | 70 | 300 |
| Dispersion for Comparison 1-m | x | 1.16 | 1.10 | 0.68 | 0.78 | 0.44 | 0.42 | 60 | 80 |
| Dispersion of Invention 1-5 | x | 1.16 | 1.16 | 0.67 | 0.69 | 0.45 | 0.45 | 50 | 55 |

Viscosity was measured at 40° C. with B-type viscosimeter, Roter No. 2.

Coagulation at mixing, fluctuation of spectral absorption before and after storage at 40° C. for about 6 hours, and viscosity are shown in the following Table F. As is apparent from the results of Table F, the dispersion of the invention provides no coagulation at mixing with a colloidal solution, little fluctuation of absorbance with elapse of time and little increase in viscosity.

While the invention has been described in detail and with reference to specific examples thereof, it will be apparent to one skilled in the art that various changes and modifications can be made therein without departing from the spirit and scope thereof.

What is claimed is:

1. A dispersion of fine solid particles obtained by pulverizing an aqueous slurry of a dye represented by the following general formula (II) in the presence of a polyalkylene oxide represented by the following general formula (I-a) or (I-b) and adding a compound represented by the following general formula (I) such that it is present during and/or after pulverization of the dye:

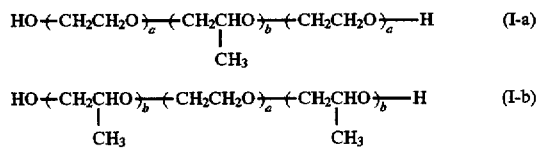

$$P-[(S)_m-R]_n \quad (I)$$

wherein a and b each represents a value of 5 to 500; R represents a hydrogen atom, a hydrophobic group or a hydrophobic polymer moiety, P represents a group containing at least one structural unit selected from the group consisting of A, B and C, and having a polymerization degree of 10 to 3500, n represents 1 or 2, and m represents 0 or 1,

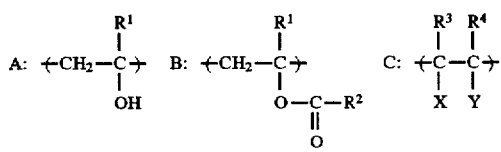

wherein $R^1$ represents a hydrogen atom or an alkyl group having 1 to 6 carbon atoms, $R^2$ represents a hydrogen atom or an alkyl group having 1 to 10 carbon atoms, $R^3$ represents a hydrogen atom or —$CH_3$, $R^4$ represents a hydrogen atom, —$CH_3$, —$CH_2COOH$ or —CN, X represents a hydrogen atom, —COOH or —$CONH_2$, Y represents —COOH, —$SO_3H$, —$OSO_3H$, —$CH_2SO_3H$, —CONHC($CH_3$)$_2CH_2SO_3H$ or —CONHCH$_2$CH$_2$CH$_2$N$^+$(CH$_3$)$_3$Cl$^-$;

$$D-(X)_y \quad (II)$$

wherein D represents a residue of a compound having a chromophore, X represents a dissociative hydrogen or a group having a dissociative hydrogen, and y is an integer of 1 to 7.

2. The dispersion of fine solid particles according to claim 1, wherein the group having dissociative hydrogen in general formula (II) is a group having a carboxylic acid group.

3. The dispersion of fine solid particles according to claim 1, wherein the weight ratio of the polyalkylene oxide represented by general formula (I-a) or (I-b) to the dye is 0.05 to 0.5.

4. The dispersion of fine solid particles according to claim 1, wherein said dye is a compound represented by the following general formula (III) or (IV):

$$A^1=L^1+L^2=L^3\!\!\!\!-_m Q \quad (III)$$

wherein $A^1$ represents an acidic nucleus, Q represents an aryl group or a heterocyclic group, $L^1$, $L^2$ and $L^3$ each represents a methine group, and m is 0, 1 or 2, with the proviso that the compound represented by formula (III) has 1 to 7 groups selected from the group consisting of carboxylic acid groups, sulfonamido groups, sulfamoyl groups, sulfonylcarbamoyl groups, acylsulfamoyl groups, phenolic hydroxyl groups and enol groups of oxonol dyes in the molecule as water-soluble groups;

$$A^1=L^1+L^2=L^3\!\!\!\!-_n A^2 \quad (IV)$$

wherein $A^1$ and $A^2$ each represents an acidic nucleus $L^1$, $L^2$ and $L^3$ each represents a methine group, and n is 0, 1, 2 or 3, with the proviso that the compound represented by formula (IV) has 1 to 7 groups selected from the group consisting of carboxylic acid groups, sulfonamido groups, sulfamoyl groups, sulfonylcarbamoyl groups, acylsulfamoyl groups, phenolic hydroxyl groups and enol groups of oxonol dyes in the molecule as water-soluble groups.

5. The dispersion of fine solid particles according to claim 1, wherein said dye is a compound represented by the following general formula (V):

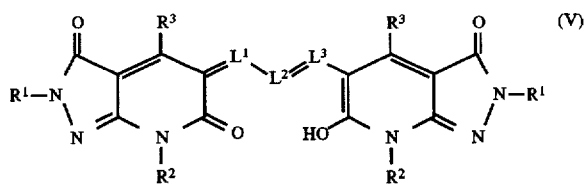

wherein $R^1$ represents a hydrogen atom, an alkyl group, an aryl group or a heterocyclic group, $R^2$ represents a hydrogen atom, an alkyl group, an aryl group, a heterocyclic group, —$COR^4$ or —$SO_2R^4$, $R^3$ represents a hydrogen atom, a cyano group, a hydroxyl group, a carboxyl group, an alkyl group, an aryl group, $-CO_2R^4$, $-OR^4$, $-NR^5R^6$, $-CONR^5R^6$, $-NR^5COR^4$, $-NR^5SO_2R^4$ or $-NR^5CONR^5R^6$ (wherein $R^4$ represents an alkyl group or an aryl group, and $R^5$ and $R^6$ each represents an hydrogen atom, an alkyl group or an aryl group), and $L^1$, $L^2$ and $L^3$ each represents a methine group.

6. The dispersion of fine solid particles according to claim 1, wherein the weight ratio of polyethylene oxide moieties in the polyalkylene oxide represented by the general formula (I-a) or (I-b) is 0.3 to 0.9.

* * * * *